United States Patent [19]

Ohyama et al.

[11] 4,209,783
[45] Jun. 24, 1980

[54] OBJECT IDENTIFICATION SYSTEM

[75] Inventors: Masumi Ohyama; Johji Sakuragi, both of Tokyo; Masanori Aono, Sagamihara; Takeshi Ochi, Yokohama, all of Japan

[73] Assignee: Tokyo Shibaura Electric Company, Limited, Kawasaki, Japan

[21] Appl. No.: 889,114

[22] Filed: Mar. 22, 1978

[30] Foreign Application Priority Data

Mar. 30, 1977 [JP] Japan .................................. 52-34374

[51] Int. Cl.² .......................... G08G 1/01; G01S 9/56; H04Q 9/00
[52] U.S. Cl. ............................... 340/152 T; 340/38 L; 340/567; 343/6.5 SS; 343/6.5 LC
[58] Field of Search .................. 340/152 T, 38 L, 567; 343/6.5 SS, 6.5 LC

[56] References Cited

U.S. PATENT DOCUMENTS

| | | | |
|---|---|---|---|
| 3,363,247 | 1/1968 | Chausse et al. | 343/6.5 SS |
| 3,705,402 | 12/1972 | Ballantyne et al. | 343/6.5 LC |
| 3,737,911 | 6/1973 | Sakuragi et al. | 343/6.5 SS |
| 3,883,868 | 5/1975 | Palmer | 340/152 T |
| 3,900,829 | 8/1975 | Long | 340/38 L |
| 4,023,167 | 5/1977 | Wahlstrom | 343/6.5 SS |
| 4,069,472 | 1/1978 | Kamata et al. | 343/6.5 SS |

Primary Examiner—Donald J. Yusko
Attorney, Agent, or Firm—Oblon, Fisher, Spivak, McClelland & Maier

[57] ABSTRACT

A transmitting/receiving antenna radiates a sweep frequency signal as an interrogation signal to an answer device. The answer device includes a plurality of resonators which are connected in parallel and have different resonance frequencies and answer antenna means connected in parallel with these resonators and transmits resonance answer signals including ringing answer signals corresponding to the resonators, in response to the interrogation signal. A phase adjusting means is provided which receives at the inputs the sweep frequency signal and the resonance answer signal and adjusts the phases of these signals to have the phase difference therebetween 0° or 180°. The output of the phase adjusting means is applied to a detector where the ringing answer signals are detected to form binary answer signals corresponding to the ringing answer signals, respectively. An object with the answer device fixed thereat is identified from these binary answer signals.

10 Claims, 81 Drawing Figures

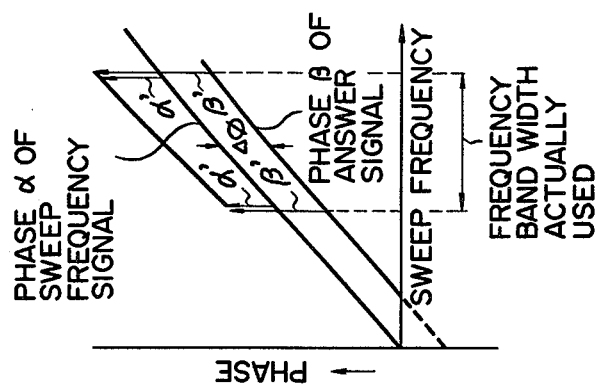
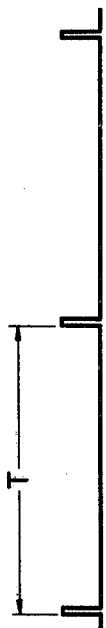
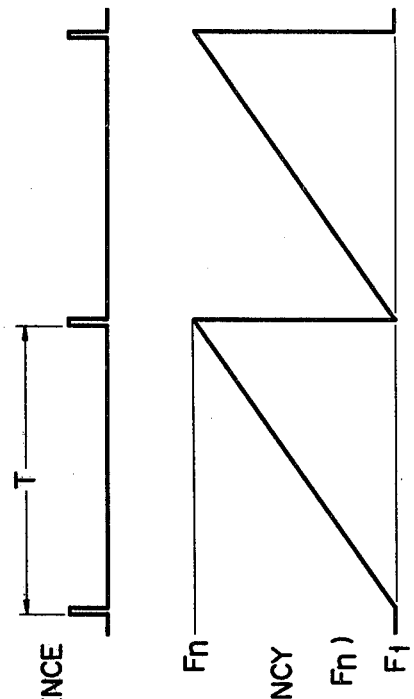
FIG. 5
FIG. 4A  REFERENCE PULSE
FIG. 4B  SWEEP FREQUENCY SIGNAL ($F_1$ TO $F_n$)
FIG. 4C  TIMING PULSE FROM 134

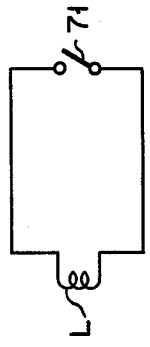
FIG. 7
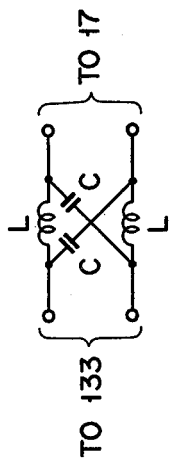
FIG. 6
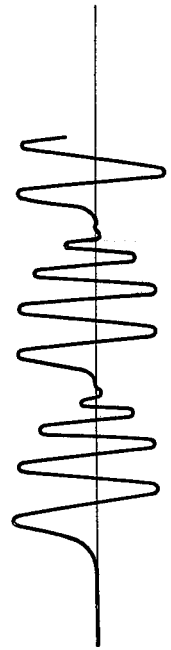
OVERLAPPED RINGING ANSWER SIGNAL
FIG. 8A
SEPARATED RINGING ANSWER SIGNAL
FIG. 8B

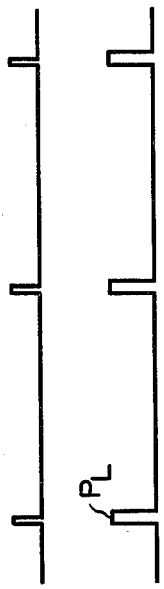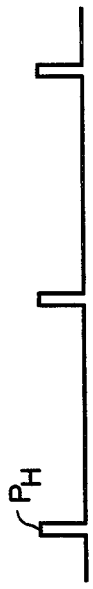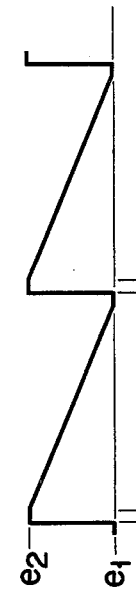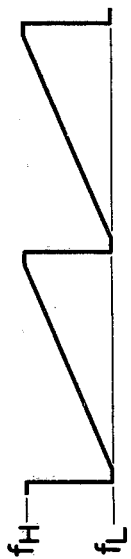
FIG. 14A OUTPUT OF 131
FIG. 14B OUTPUT OF 1321
FIG. 14C OUTPUT OF 1321
FIG. 14D OUTPUT OF 1322
FIG. 14E OUTPUT OF 1324

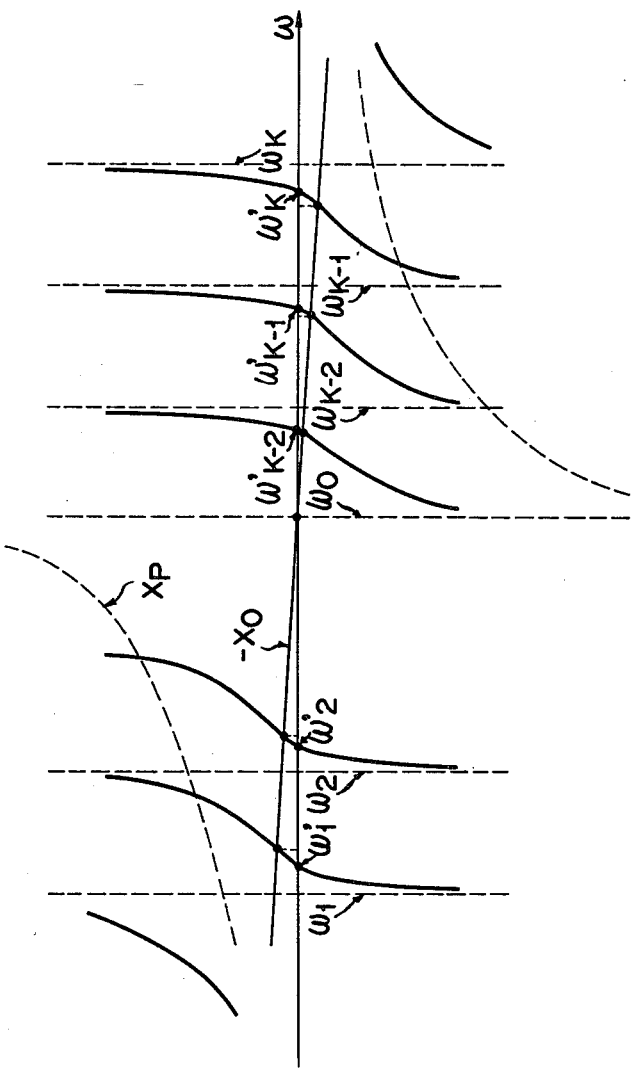
F I G. 24

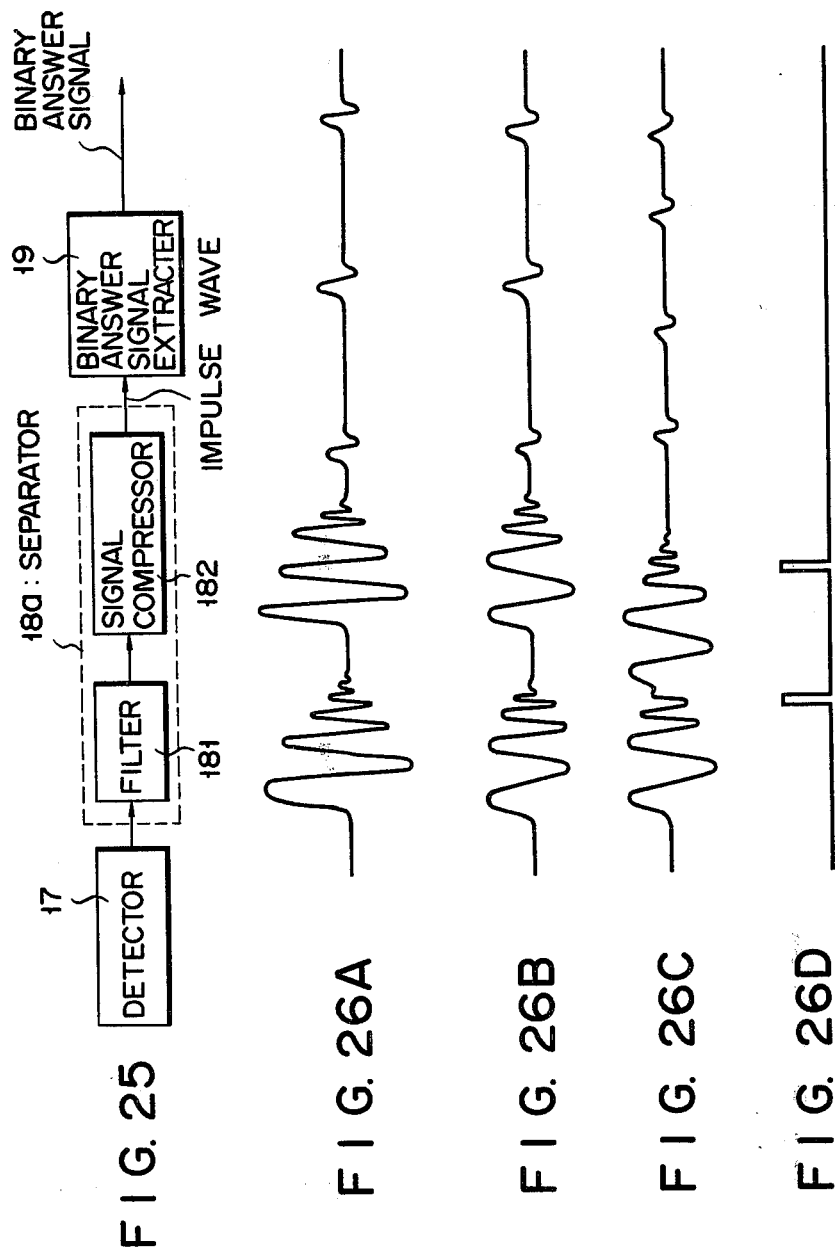

EQUIVALENT DELAY CIRCUIT
CONSTITUTING SIGNAL COMPRESSOR 182

INPUT OF IMPULSE NOISE

OUTPUT OF 182 FOR INPUT OF IMPULSE NOISE

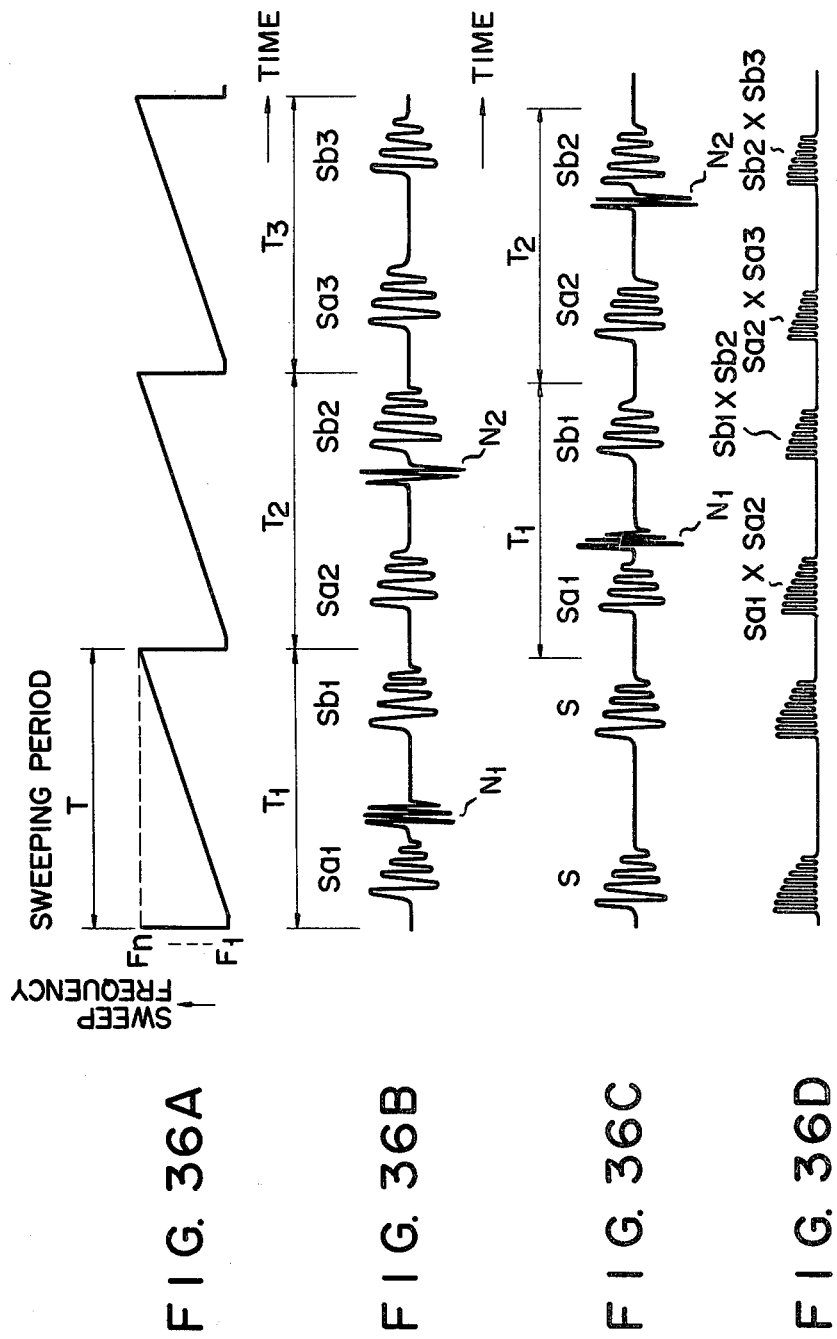

| INPUT | | | OUTPUT | |
|---|---|---|---|---|
| A | B | Cn | Σ | Cn+1 |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

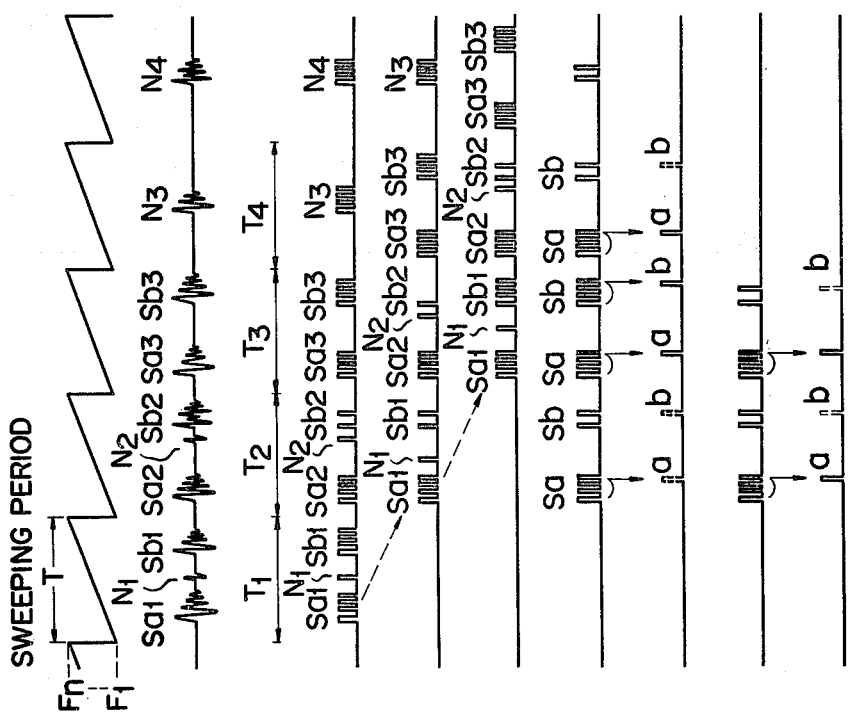

OBJECT IDENTIFICATION SYSTEM

The present invention relates to an improvement of an object identification system to identify an object by properly processing a resonance answer signal formed through the sweeping of a plurality of resonators provided to the object by a sweep frequency signal.

In one of known object identification systems, a transmitter transmits a sweep frequency signal to an answer device which is included in an object to be identified and includes a plurality of resonators with different resonance frequencies. The transmitter further receives a resonance answer signal relating to the sweep frequency signal from the answer device and identifies the information inherent to the object. Such a system is shown in FIG. 1. As shown, a sweep frequency signal generator 1 generates a sweep frequency signal which is then amplified by a power amplifier 2 and then is radiated from a transmitting/receiving antenna 3 toward the answer device 4. The answer device 4 is mounted on a vehicular object running at a high speed and receives the sweep frequency signal, i.e. an interrogation wave, transmitted from the transmitter, by a receiving antenna 5. The receiving antenna 5 is connected in parallel with a plurality of resonators $7_l$ to $7_n$, through a capacitor 6. The resonators $7_l$ to $7_n$ parallelly connected among other may each be constructed by using a piezoelectric element such as ceramic or crystal, a lumped constant circuit including L, R and C, or an active element associated with L, R and C. The answer device 4 approaches the transmitting/receiving antenna 3 to enter the electromagnetic field of the antenna 3. At this time, the answer antenna receives the sweep frequency signal, through the electromagnetic induction coupling with the transmitting/receiving antenna. When the frequency of the sweep frequency signal coincides with any one of the resonance frequencies of the resonance elements $7_l$ to $7_n$, the impedance of the resonance element resonating with the sweep frequency decreases to permit large current to flow into the answer antenna 5. As a result, the answer antenna 5 radiates a radio wave corresponding to the resonating resonance element in the form of an answer radio wave or a resonance answer signal. Now assume that the resonance elements, i.e. resonators, each constitute a series resonant circuit. The answer radio wave is received by the transmitting/receiving antenna 3. A signal induced by the receiving radio wave passes through a band-pass filter 8 to become a signal as shown in FIG. 2A. As shown, the signal of FIG. 2A includes two resonance answer signals at lower side of the frequency and a number of noise signals at the higher side of the frequency. It should be understood here that the fact that the answer antenna 5 radiates a radio wave toward the transmitting/receiving antenna 3 implies that, when the answer device 4 is viewed from the transmitting/receiving antenna 3, the impedance of the transmitting/receiving antenna 3 changes and the phase of the receiving signal changes. A reference signal is set up by phase-shifting by $\pi/2$ radian the sweep frequency signal fed from the sweep frequency signal generator 1, through a phase shifter 9. The phase difference between the reference signal and the signal from the transmitting/receiving antenna 3 are detected by a phase detector 10 to detect the phase change of the received resonance answer signal.

Some examples of the phase detector 10 are a detector to multiply the amplitude ratio of the input signal to the reference signal (the output of the phase shifter 9), for example, a ring modulator, by the phase difference between these signals and a phase detector such as a ratio detector. The output signal (including a ringing answer signal as shown in FIG. 2B) of the phase detector 10 is transformed by a level detector 11 into a train of pulses including the pulsed answer signal as shown in FIG. 2C, for example. The pulse train is properly processed by a noise pulse eliminating circuit 12 and a proper circuit not shown. Through the proper procession, an object with the answer device 4 may be identified.

The resonance answer signal (FIG. 2A) arising from the sweeping by the sweep frequency signal, from the resonators $7_l$ to $7_n$ each with an extremely high Q includes ringing components (FIG. 2B) the amplitudes of which are exponentially decrease with time according to the frequency-amplitude characteristic (static characteristic) of the resonator and the discharge of energy stored in the resonator. Accordingly, the output signal of the phase detector 10 includes a beat signal, i.e. a ringing answer signal, which progressively increases in the frequency but decreases in the amplitude with respect to time, as shown in FIG. 2B. The intervals between adjacent pulses constituting a pulsed answer signal (FIG. 2C) obtained from the beat signal through the level detector 11 changes at a predetermined rate. On the contrary, the pulse intervals of the pulsed noise (FIG. 2C) formed by detecting impulse noise signal (see FIG. 2A) are arranged at random. The output pulse train (FIG. 2C) of the level detector 11 is applied to the noise pulse eliminating circuit 12 including a shift register. When the eliminating circuit 12 detects the fact that the pulse intervals of the pulses change at predetermined rate, it is judged that these pulses correspond to the answer signal, and one pulse (a binary answer signal) is produced for the pulsed answer signal. At this time, the pulses having random pulse intervals is judged as the noise signal and are eliminated.

It is noted, however, that, under such a condition that these noise pulses similar to the pulsed answer signal are continuously generated, erroneous detection of the ringing answer signal will possibly result.

In the conventional object identification system shown in FIG. 1, when a pattern of a pulsed answer signal from the level detector 11 is compared with a predetermined pattern of a pulsed answer signal, these patterns are not necessarily coincident completely with each other. The reason for this is that the phase of the ringing answer signal slightly shifts depending on the frequency of the sweep frequency signal for a reason to be described later. The fact that the ringing answer signals each produced with a phase slightly shifted are processed on the same basis indicates to broaden the selectivity of the noise removal circuit 12. That is to say, the noise pulse removal circuit 12 possibly permits the noise pulses to pass therethrough. Particularly the continuously generating impulses are possibly and erroneously detected as the answer signal, since the generation pattern of the impulse noise coincides with the pulsed answer signal pattern.

Such the continuously generating impulses are frequently found in the object identification system particularly for freight or vestibule cars. In spite of this, none of such type object identification system has had a measure to discriminate the continuously generating impulses from the ringing answer signal.

Accordingly, an object of the present invention is to provide an object identification system with improved object identification ability in which a resonance answer signal from the answer device may clearly be discriminated from the continuous impulse noises.

According to the invention, there is provided an object identification system comprising: an interrogation circuit including a sweep frequency signal generator for generating a sweep frequency signal; a transmitting/receiving duplex circuit connected to the interrogation circuit; transmitting/receiving antenna means which is connected to the transmitting/receiving duplex circuit and transmits the sweep frequency signal as an interrogation signal; an answer device which includes a plurality of resonators with different resonance frequencies connected in parallel one another and answer antenna means connected in parallel with the resonators, and which is fixed on an object to be identified and transmits resonance answer signals corresponding to resonances of the resonators in response to the interrogation signal toward the transmitting/receiving antenna means; phase adjusting means which is connected to the transmitting/receiving duplex circuit and the interrogation circuit and adjust the phases of the sweep frequency signal from the sweep frequency signal generating circuit and the resonance answer signal to have a phase difference of substantially 0 or 180 degrees; a detector for detecting a ringing answer signal included in the resonance answer signal from the output signal of the phase adjusting means; a separation circuit for separating the ringing answer signals included in an output of the detector; a signal extracting circuit for extracting binary answer signals corresponding to the separated ringing answer signals; and a memory circuit for storing the binary answer signals.

In the object identification system of the invention, the phases of the resonance answer signal from the answer device and the sweep frequency signal from the interrogation circuit are controlled in a phase adjusting means so as to be 0° or 180° in the phase difference at any place, i.e. the start to end of the sweeping and then the ringing answer signal is detected. Therefore, the same pattern of the ringing answer signal may be kept at any place of the sweeping so that the judging standard of the signal extractor may be strict. Additionally, the system of the invention may eliminate "rail incomplete contact noise" to be described later which has 90° phase difference from the resonance answer signal. As a result, the ringing answer signal may clearly be discriminated from the continuous impulse included as a noise signal in the resonance answer signal train. The end effect attained by the invention is a remarkable improvement of an object identification ability of the system over that of the conventional one.

The above and other objects and features of the invention will be apparent from the following description taken in connection with the accompanying drawings, in which:

FIGS. 4A to 4C show wave forms useful in explaining the operation of an interrogation signal circuit shown in FIG. 3;

FIG. 5 shows a characteristic curve for illustrating a phase relation between an answer signal and a sweep frequency signal;

FIG. 6 shows a circuit diagram of one form of phase shifters used as a phase adjusting means shown in FIG. 3;

FIG. 7 shows a model loop of an impulse noise source;

FIGS. 8A and 8B show wave forms of ringing answer signals included in resonance answer signals;

FIGS. 14A to 14E show wave forms of signals at major portions in the FIG. 13 circuit;

Figure 3:
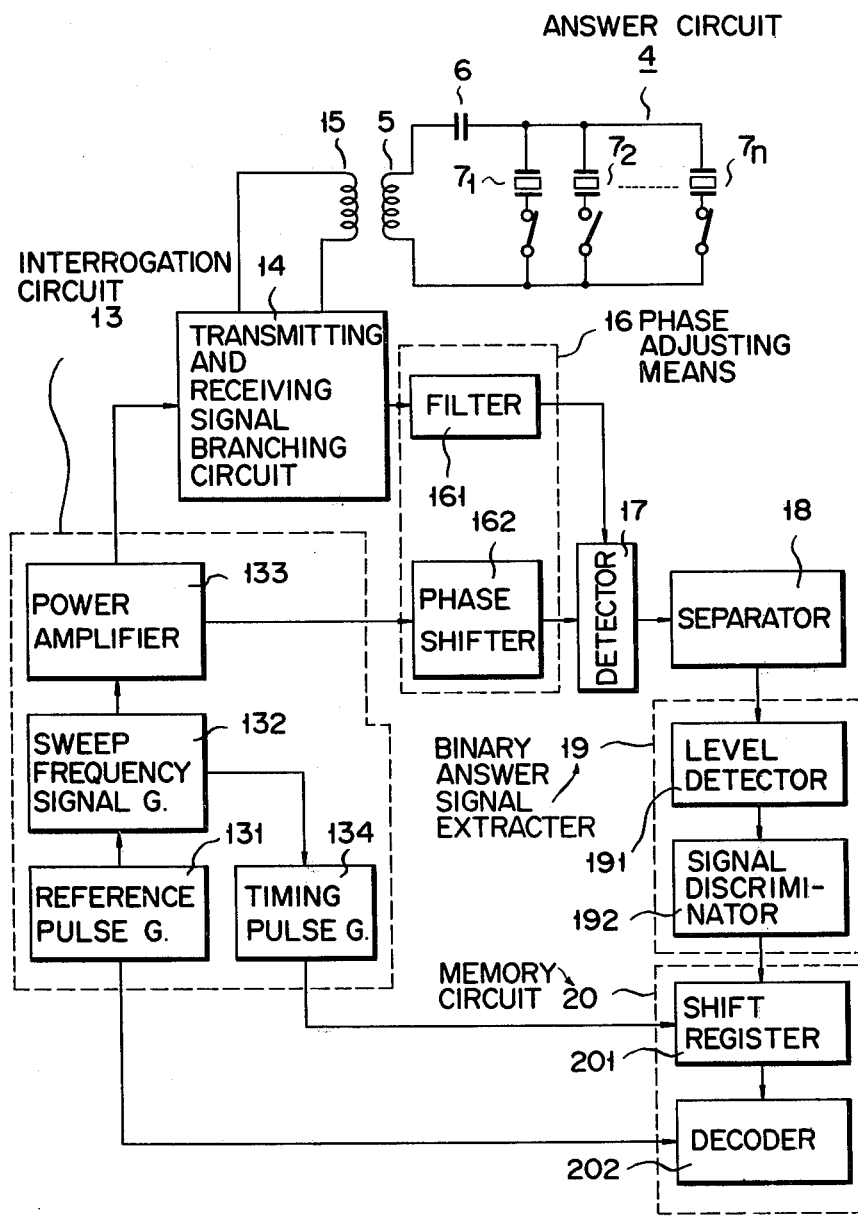
FIG. 3 is a block diagram of an embodiment of an object identification system according to the present invention.
Figure 16:
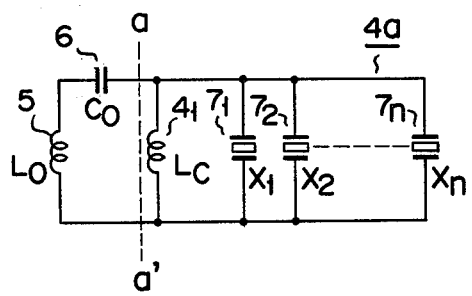
FIG. 16 shows a modification of the answer device shown in FIG. 3.
Figure 23A:
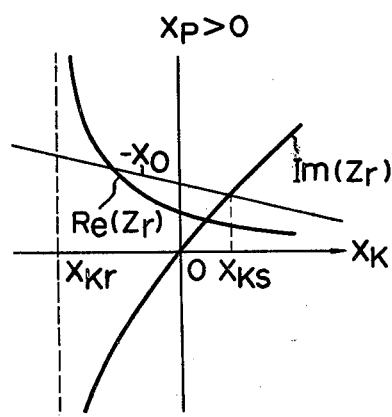
Figure 23B:
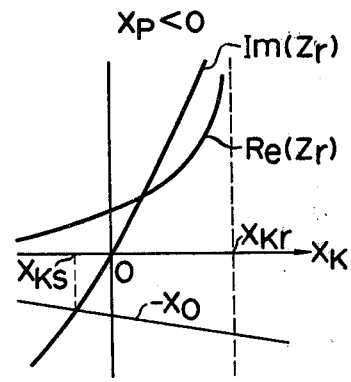
Figure 27:
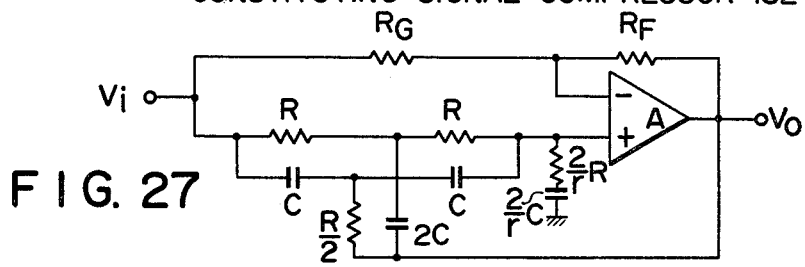
Figure 28:
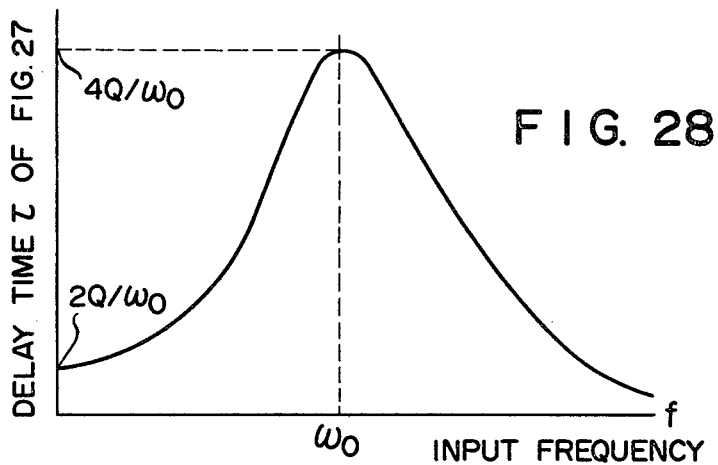
Figure 29:
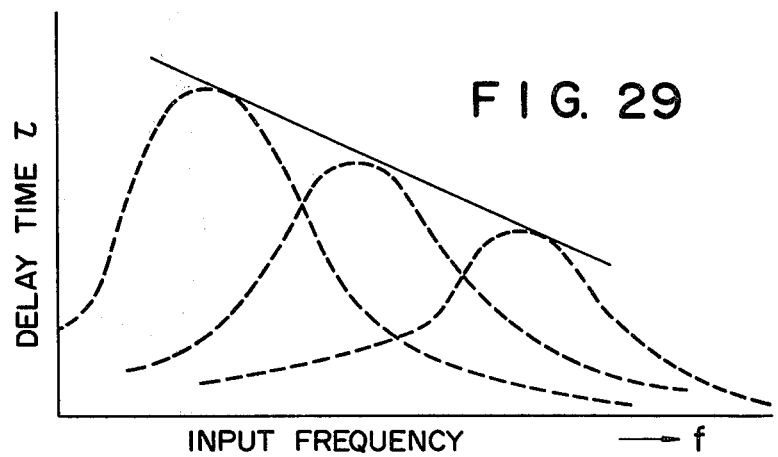
Figure 31A:
Figure 31B:
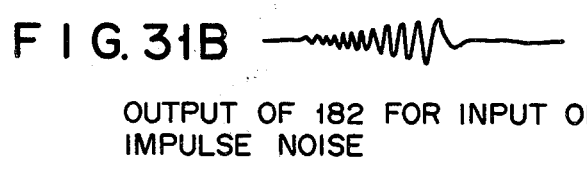
Figure 32:
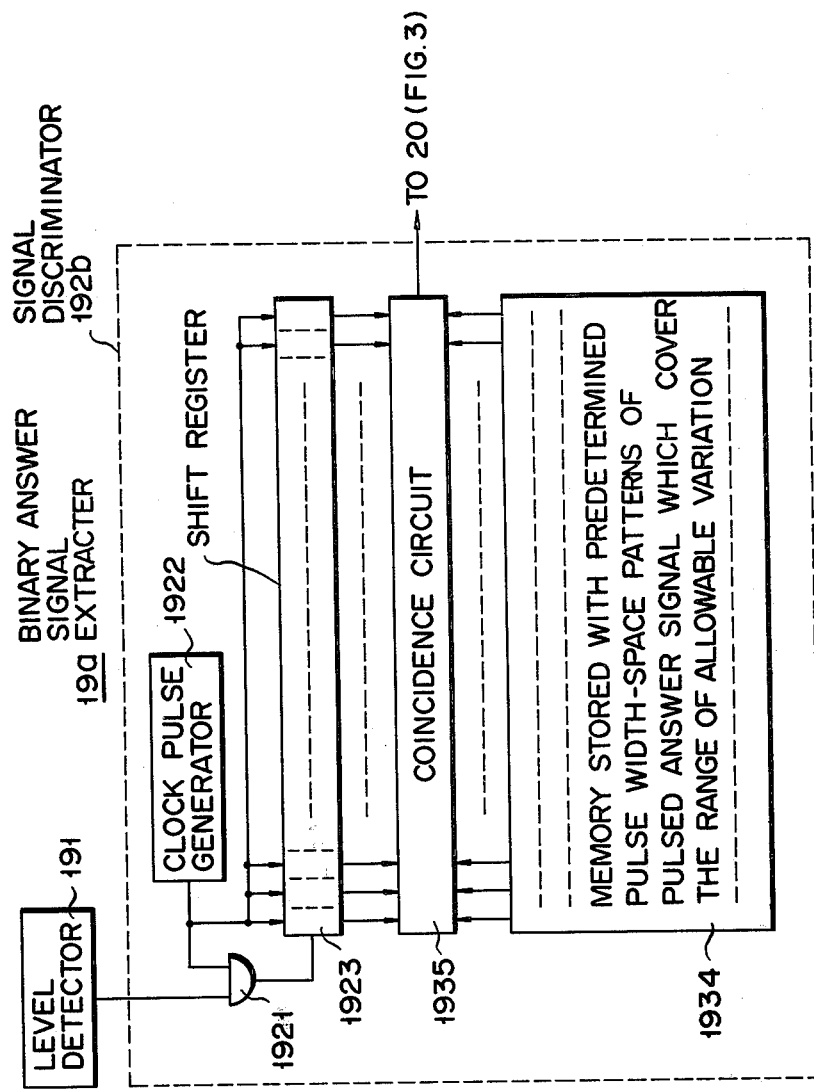
Figure 33:
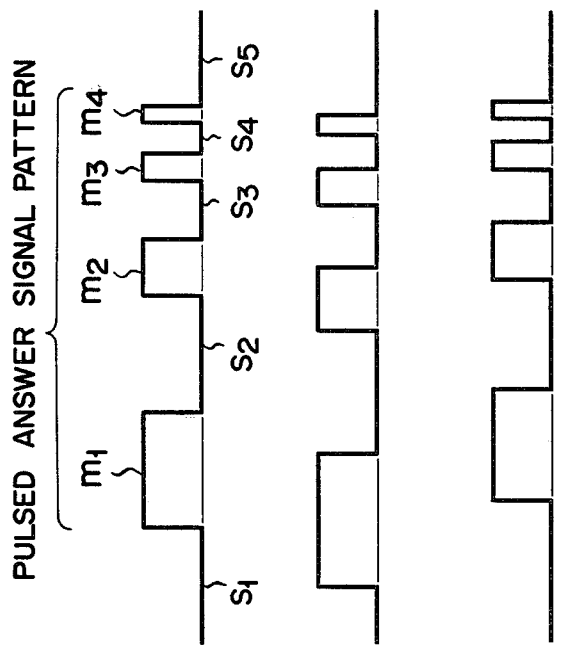
Figure 34:
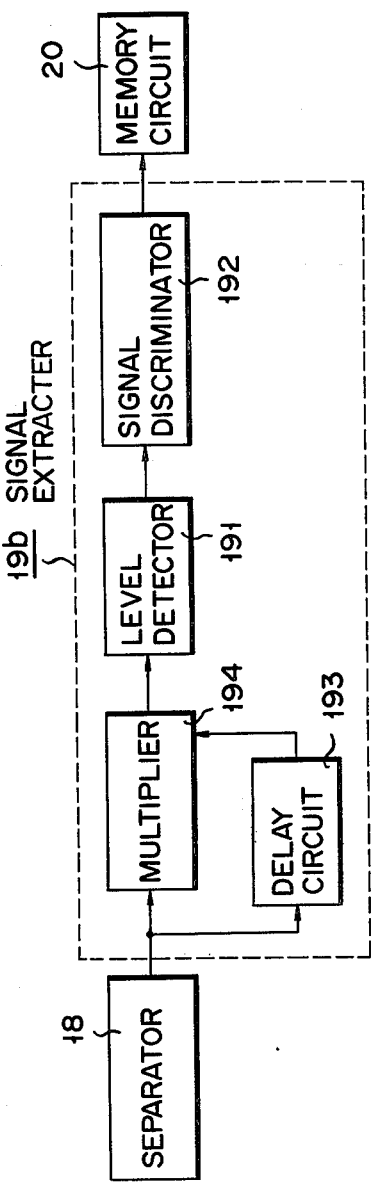
Figure 35:
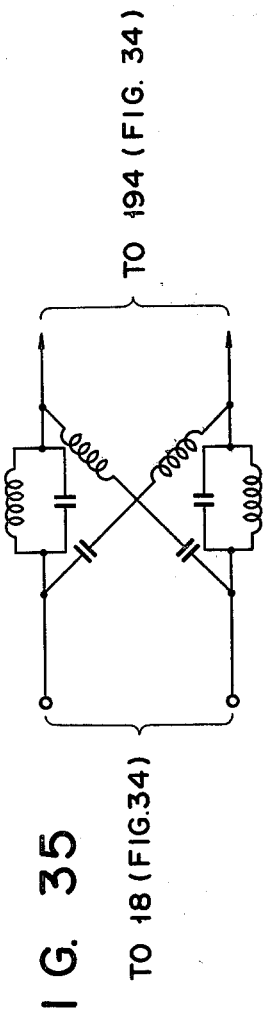
Figure 37:
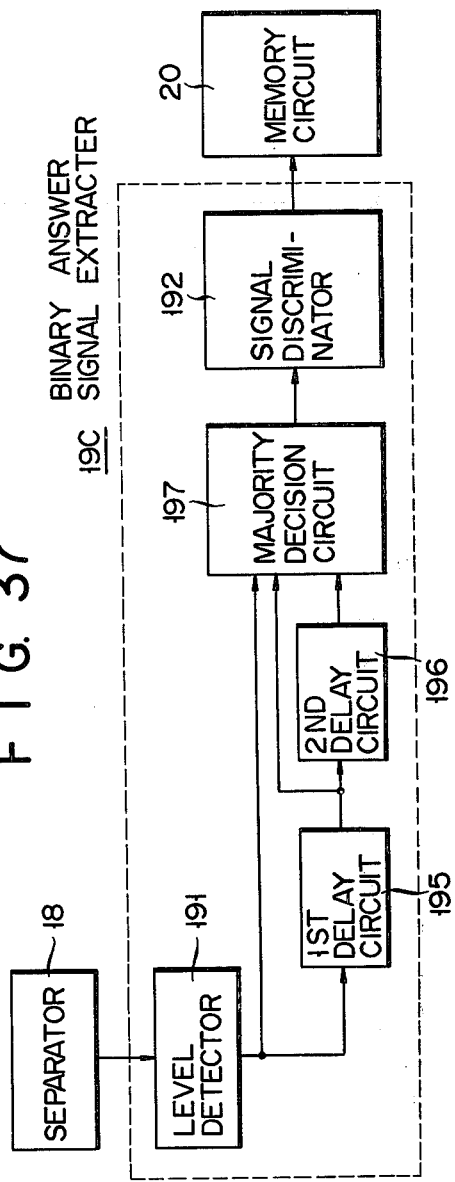
Figures 38A, 38B:
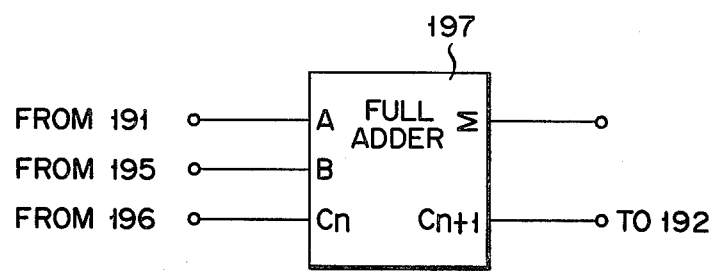
Figure 40:
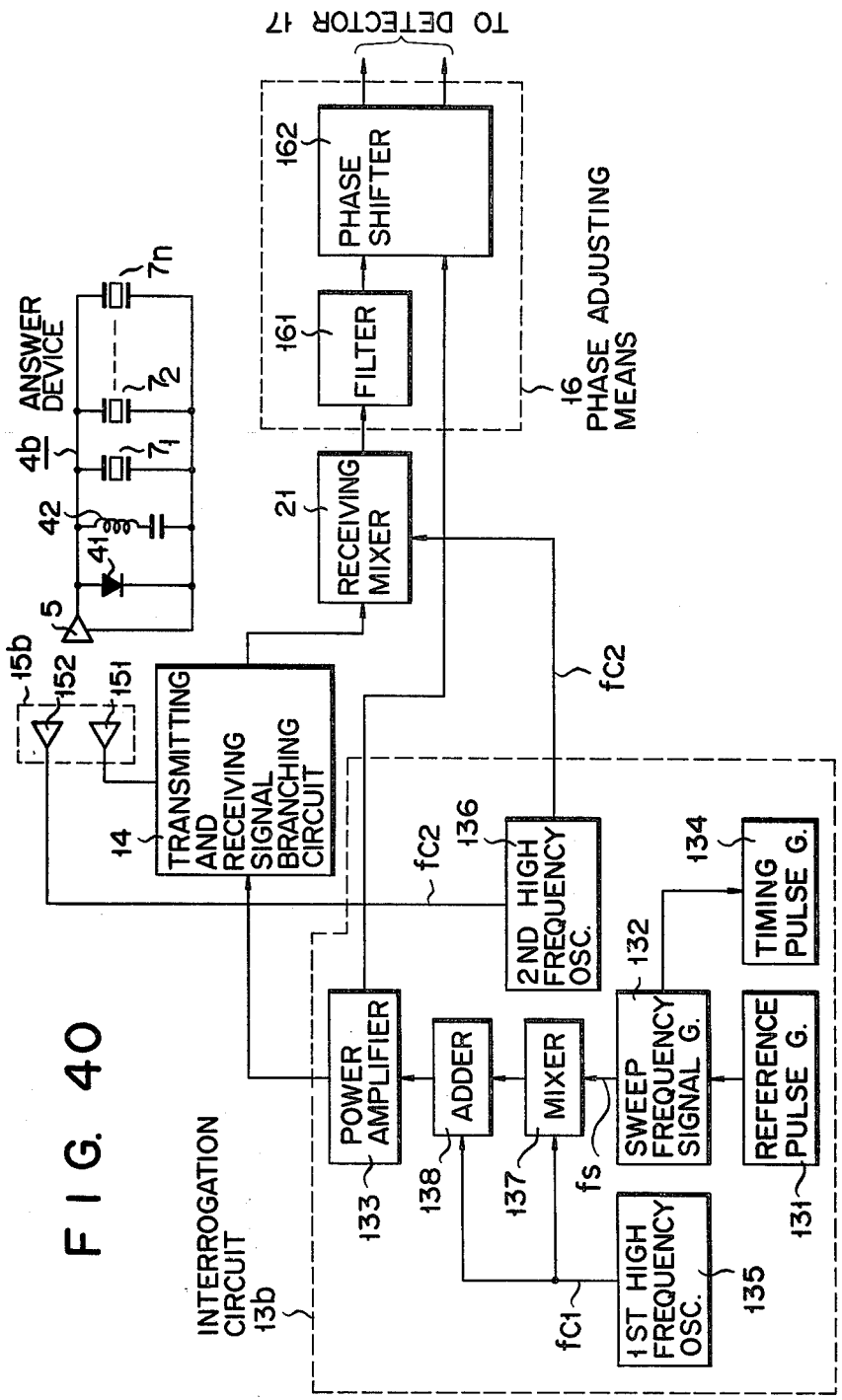
Figure 41:
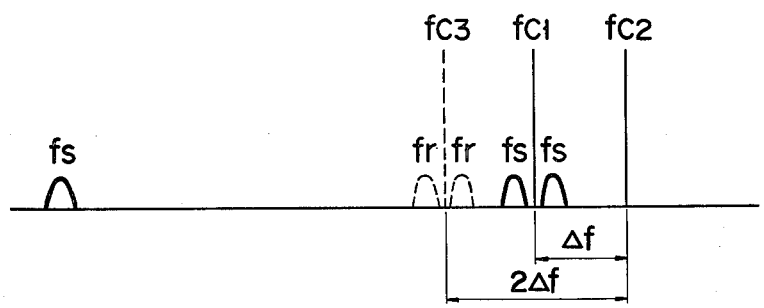
Figure 42:
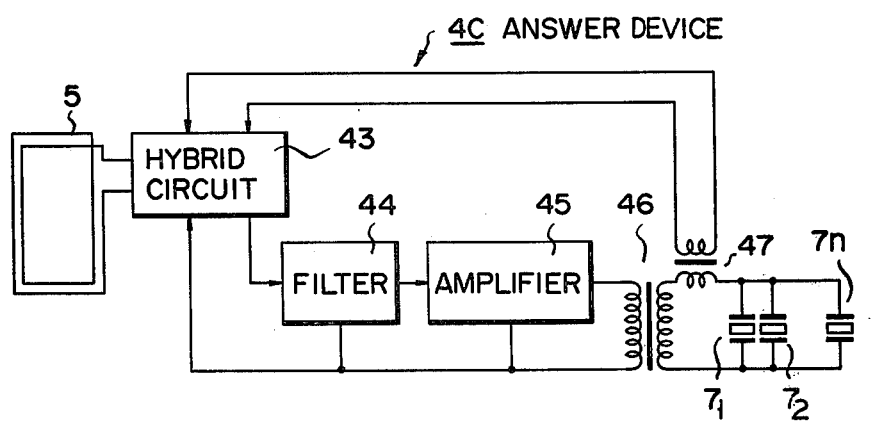

FIGS. 23A and 23B schematically illustrate that a resonance point $X_{KS}$ and an anti-resonance point $X_{Kr}$ are different when $X_p$ is positive and negative in the answer device shown in FIG. 16;

FIG. 24 schematically illustrates that, when a single resonator is assembled into the answer device, the resonance point of the resonator shifts;

FIG. 25 shows a block diagram of a modification of the separator shown in FIG. 3;

FIGS. 26A to 26D show a set of wave forms useful in explaining the operation of the separator shown in FIG. 25;

FIG. 27 shows a circuit diagram of an equivalent delay circuit constituting a signal compressor shown in FIG. 25;

FIG. 28 shows a relation between an input frequency and a delay time of the delay circuit shown in FIG. 27;

FIG. 29 shows a relation between an input frequency and a delay time when a plurality of delay circuits of FIG. 27 are connected in series;

FIGS. 30A to 30F show wave forms of input/output signals of the signal compressor shown in FIG. 25;

FIGS. 31A and 31B show wave forms of other input-/output signals of the signal compressor in FIG. 25;

FIG. 32 shows a block diagram of a modification of a binary answer signal extractor shown in FIG. 3;

FIGS. 33A to 33C are a set of wave forms for illustrating the operation of the FIG. 32 circuit;

FIG. 34 show a block diagram of another modification of the binary answer signal extractor shown in FIG. 3;

FIG. 35 is a circuit diagram of a delay circuit shown in FIG. 34;

FIGS. 36A to 36F show a set of wave forms for illustrating the operation of the circuit in FIG. 34;

FIG. 37 is a block diagram of still another modification of the binary answer signal extractor shown in FIG. 3;

FIGS. 38A and 38B show an example of a majority decision circuit shown in FIG. 37;

FIGS. 39A to 39I show a set of wave forms for illustrating the operation of the FIG. 37 circuit;

FIG. 40 is a block diagram of a modification of the circuit in FIG. 3;

FIG. 41 illustrates a relation among frequencies of various signals in the circuit shown in FIG. 40; and FIG. 42 shows a block diagram of yet another modification of the answer device shown in FIG. 3.

Reference is made to FIG. 3 illustrating an embodiment of an object identification system according to the invention. In the figure, a sweep frequency signal from an interrogation circuit 13 is fed to a transmitting-/receiving duplex circuit or transmitting/receiving signal branching circuit 14. The transmitting/receiving duplex circuit 14 is constructed by a hybrid circuit, for example, and permits the sweep frequency signal from the interrogation circuit 13 to go to an antenna 15 which is used for both transmitting and receiving. The sweep frequency signal, i.e. an interrogation signal, is radiated from the antenna 15 toward an answer device 4.

As in the conventional object identification system, the answer device 4 is mounted on a moving body running at a high speed. The answer device 4 receives the interrogation signal by an answer antenna 5 serving as a receiving and transmitting antenna and the received interrogation signal drives resonators $7_l$ to $7_n$ connected in parallel. A resonance answer signal corresponding to the resonator resonating at the frequency of the interrogation signal is radiated from the antenna 5 toward the receiving/transmitting antenna 15. The resonance answer signal from the answer device 4 is received by the antenna 15 and applied to the phase adjusting means 16, through the transmitting/receiving duplex circuit 14. The phase adjusting means having also received the sweep frequency signal from the interrogation circuit 13, controls the phase difference between both the input signals so as to be 0° or 180° and applies the phase controlled signals to a phase detector 17. The detector 17 detects a plurality of resonance answer signals from the answer device 4 and, as previously stated referring to FIG. 2B, outputs ringing answer signals included in the resonance answer signals. Adjacent ringing answer signals are separated by a separation circuit 18 and the separated ones are applied to a binary answer signal extractor 19. A binary answer signal from the extractor 19 is applied to a memory circuit 20.

The object identification system according to the invention is provided particularly with the phase adjusting means 16 by which the resonance answer signal from the answer device 4 and the sweep frequency signal from the interrogation circuit 13 are phase-controlled to have the phase difference 0° or 180° at any place of the sweeping, i.e. from the start to the end of the sweeping. Therefore, the same pattern of the ringing answer signal may be kept at any place of the sweeping so that the standard of the signal discriminator in a binary answer signal extractor to be described later may be strict. Additionally, the system of the invention may eliminate "rail incomplete contact noise" to be described later which has 90° phase difference from the resonance answer signal. The result is a clear discrimination of the ringing answer signal from the continuous impulse signal of noise.

The embodiment shown in FIG. 3 will be further elaborated referring to FIGS. 4(A, B and C) to 12(A, B, C and D). The interrogation circuit 13 comprises a reference signal generator 131, a sweep frequency signal generator 132, a power amplifier 133, and a timing pulse generator 134. The reference pulse generator 131 generates reference pulses with a repetition period T ruling the timing of an entire operation of the system of the invention. The reference pulses are applied to the sweep frequency signal generator 132 which in turn generates a sweep frequency signal of which the frequency changes from $F_l$ to $F_n$ during one sweeping period. Assume that the frequencies from $F_l$ to $F_n$ are proportional to the amplitude of a sawtooth wave as shown. The sweep frequency signal of the frequencies $F_l$ to $F_n$ is applied to a power amplifier circuit 133. The sweep frequency signal of $F_l$ to $F_n$ is applied to the timing pulse generator 134 which in turn generates timing pulses (FIG. 4C) which is in synchronism with the reference pulses (FIG. 4A) and have a period t shorter than the period T. The sweep frequency signal amplified by the power amplifier 133 is applied to the answer device 4, through the transmitting/receiving circuit 14 and the antenna 15. The resonating timing of the resonators $7_l$ to $7_n$ in the answer device 4 is set up to synchronize with the timing pulse (FIG. 4C) from the timing pulse generator 134.

Figure 2:
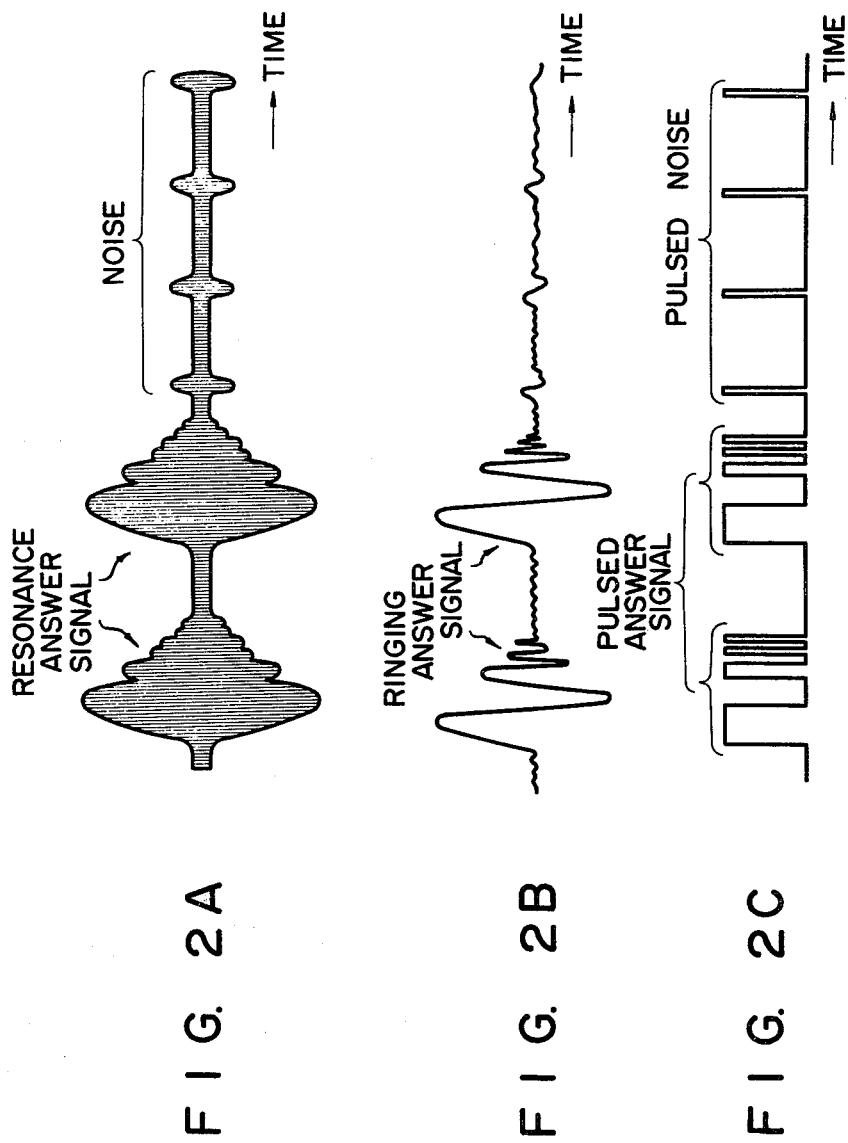
FIGS. 2A to 2C show wave forms of signals at major portions of the circuit in FIG. 1.

The resonance answer signal FIG. 2A) from the answer device 4 is fed to the phase adjusting means 16, through the antenna 15 and the transmitting/receiving duplex circuit 14. The phase adjusting means 16 is constructed by a filter 161 and a phase shifter 162, for example. The filter 161 has the same function as that of a band-pass filter 8 shown in FIG. 8 and receives the signal from the duplex circuit 14 and produces only a signal with frequency falling within a given frequency band as shown in FIG. 2A. The output signal (FIG. 2B) of the filter 16 is applied to the detector 17 together with the output signal of the power amplifier 133 fed through the phase shifter 162. The end of the phase adjusting means 16 is to set the phase difference between the resonance answer signal (FIG. 2A) from the transmitting/receiving duplex circuit and the sweep frequency signal from the power amplifier circuit 133 uniformly at 0° or 180° over entire sweep frequency range. Both the signals with such a phase difference are applied to the detector 17 so that only the pure ringing answer signal (FIG. 2B) without the noise arising from incomplete contact of rail with vehicular wheels, i.e. "rail incomplete contact noise" to be referred to later is outputted from the detector 17. Additionally, since the same pattern of the ringing answer signal may be kept over the entire range of the sweep frequency, the judging standard of the signal discrimination in the binary answer signal extracted may be strict and therefore the noise removal characteristic may be remarkably improved.

Generally, a path is very long ranging from the issuance of the resonance answer signal corresponding to the sweep frequency signal by the answer device 4 to the reaching of it to the detector 17 through the antenna 15 and the duplex circuit. Particularly, in the object identification system for freight or vestibule cars, a cable ranging from the detector 17 to the antenna 15 is substantially long. Such a transmission path is a sort of delay line and the transmission/receiving circuit may be equivalently expressed in terms of inductance and/or capacitance. Therefore, the phase characteristic of the transmission line depends on the frequency. Accordingly, when the resonance answer signal passes through the transmission path, there occurs different phase rotation, i.e. phase delay, in the resonance answer signal depending on the frequency of the resonance answer signal i.e. the sweeping position from the start to end of the sweeping. The sweep frequency signal (FIG. 4B) from the interrogation circuit 13 has a predetermined sweeping rate. With notations of $\alpha$ for the phase of the sweep frequency signal, and $\beta$ for the phase of the answer signal, the phase lag $\Delta\phi$ of $\beta$ behind $\alpha$ exhibits a linear characteristic as shown in FIG. 5. In the figure, the X-axial scale represents the frequency of the sweep frequency signal and the Y-axial scale the phases of the sweep frequency signal and the answer signal. The interval P-Q on the X-axis represents the sweep frequency band used.

In the present invention, the phase shifter 162 of the phase adjusting means 16 is used to make the phase $\Delta\alpha$ of the sweep frequency signal from the power amplifier circuit 133 coincide with the phase $\beta$ of the answer signal from the transmitting/receiving duplex circuit. The phase shifter 162 is an application of a constant phase difference wave separator and provides a fixed phase difference between two input signals over a wide frequency range. The phase shifter 162 may be constructed by using a constant resistance circuit passing all frequencies as shown in FIG. 6. In the FIG. 3 case, the phase lag $\Delta\phi$ of the answer signal is compensated by connecting the phase shifter 162 only to the output line of the power amplifier 133. However, a similar phase shifter may also be connected to the output line of the filter 161. In this case, the phase of the sweep frequency signal and the phase of the answer signal are compensated by $\alpha'$, $\alpha'$ and $\beta'$, $\beta'$, respectively, with result that the phase difference $\Delta\phi$ between the sweep frequency signal and the answer signal may be controlled to be zero.

In this manner, the phase difference of the sweep frequency signal as a reference fed from the interrogation circuit 13 and the resonance answer signal is controlled to be zero by provision of the phase shift adjusting means 16, more specifically, the phase difference between both signals is set at 0° or 180°, and then they are applied to the detector 17. As a result, the ringing patterns of the ringing answer signals (FIG. 2B) from the detector 17 are equal over the entire range of the sweep frequency.

The impulse noise received when a vehicular body passes a location where the receiver is installed is due to a switching operation of an electrical loop to be described later near the antenna 15. That is to say, cooperation of the vehicular body running at a high speed with the rail forms a loop with a switch 71, as schematically shown in FIG. 7. The loop is switched at very short random intervals when the vehicular body incompletely contacts the rail. In other words, the above-mentioned impulse noise is the switching answer signal from the electrical loop. Such noise will be referred to as "rail incomplete contact noise". The FIG. 7 loop is of non-resonance loop when it is closed (the switch 71 is closed). Therefore, at this time, the loop impedance is dominated by the self-inductance L of the close loop. On the other hand, the resonance impedance of the answer device 4 is of a pure resistance.

Figure 12:
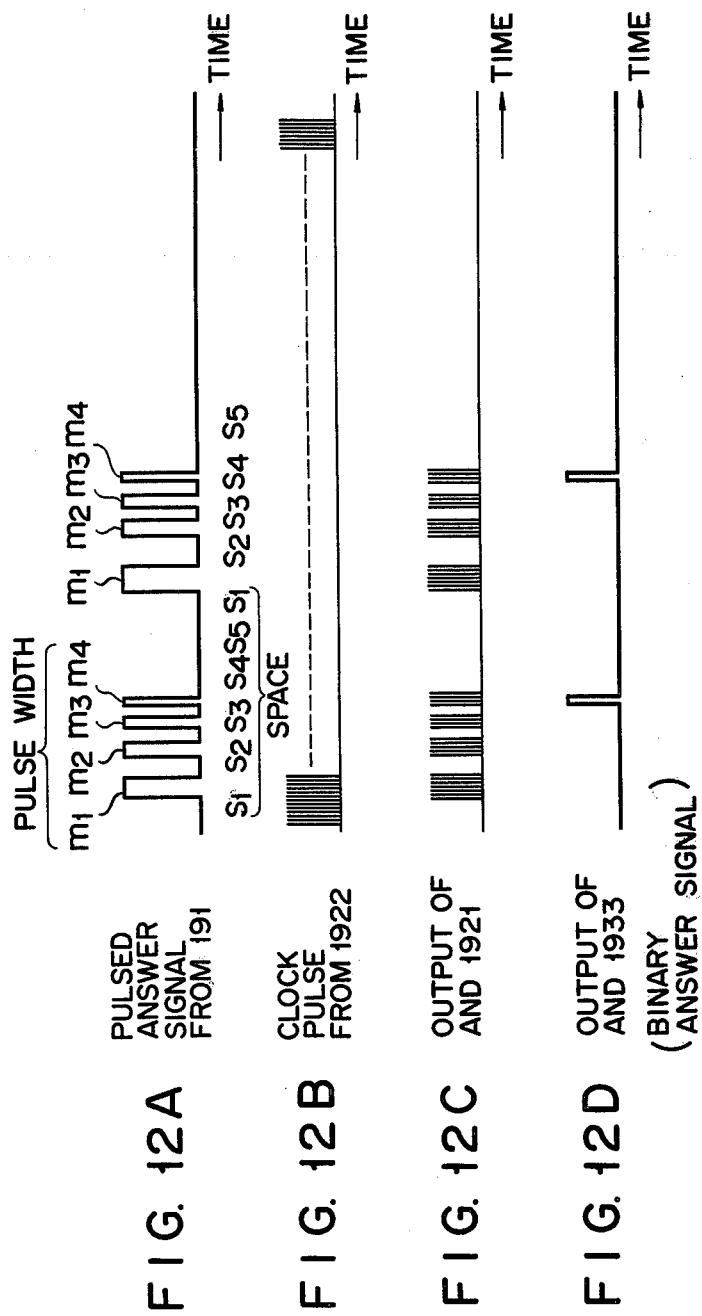
FIGS. 12A to 12D show wave forms of signals at major portions of the FIG. 11 circuit.

Accordingly, the phase of the resonance current of the answer device 4 is shifted by 90° from the phase of the current in the noise signal source, i.e. the non-resonance loop shown in FIG. 7. That is, with respect to the input signal to the antenna 15, the answer signal from the answer device 4 is phase-shifted by 90° from the switching answer signal fed from the non-resonance loop. Both the signals with 90° phase difference are applied to the phase adjusting means 16 through the transmitting/receiving duplex circuit 14. As just mentioned, the sweep frequency signal (the output signal of the power amplifier 133) as a reference is phase-adjusted by the phase adjusting means 16 to have 0° or 180° phase difference from the true resonance answer signal (FIG. 12A). Accordingly, the noise signal differing by 90° phase from the answer signal is outputted from the phase adjusting means 16, while remaining its phase difference of 90° from the resonance answer signal.

When the output signals are outputted from the phase adjusting means 16 toward the detector 17, the detector 17 outputs a signal proportional to a cosine of the phase difference $\theta$ between two input signals, i.e. cosine $\theta$, as well known. Consequently, the noise 90° phase-shifted from the resonance answer signal is completely eliminated and only the true ringing answer signal is derived from the detector 17. Additionally, since the phase adjusting means 16 phase-adjusts the sweep frequency signal phase $\alpha$ and the resonance answer signal phase $\beta$ so as to be no phase difference therebetween, the ringing signals corresponding to the resonance answer signal fed from the answer device 4 are outputted from the detector 17 at given timings, respectively.

The ringing answer signals outputted from the detector 17 are successively supplied to the separation circuit 18. The separation circuit 18 is used to distinctly separate adjacent ringing answer signals. It will be apparent that the more the amount of the information fed from the answer device 4 to identify an object is, the better. In this case, number of resonance points (resonance answer signals) included in the same frequency range is large. Accordingly, it is unavoidable that there are overlapping portions between adjacent ringing answer signals, as shown in FIG. 8A.

Figure 9:
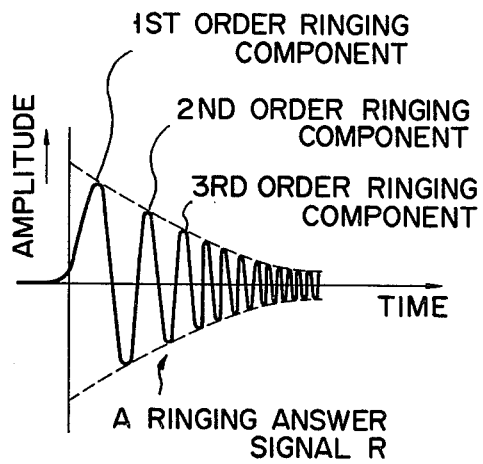
FIG. 9 shows a model wave form of a ringing answer signal.

FIG. 9 shows an exemplar of a ringing answer signal wave form. As shown, the wave form of the ringing answer signal includes first, second, . . . orders ringing components. The ringing answer signal R is expressed by an equation (1)

$$R = Ae^{-\frac{\omega_0}{2Q}(t-\tau)} \cos\{\pi h(t-\tau)^2 + \psi\} \quad (1)$$

where
A: coefficient
Q: Q (quality factor) of the resonator
$\omega_0$: resonance angular frequency of the resonator t: time that the frequency of the sweep frequency signal reaches the resonance frequency of the resonator h: rate of change of the frequency of the sweep frequency signal $\psi$: operating point of the phase detector The ringing answer signal R has the following features:

(1) The amplitude of the ringing components of a ringing answer signal exponentially damps with time, with the time constant of $2Q/\omega_o$.

(2) With respect to the phase of the ringing components;
  (a) the instantaneous phase thereof changes in accordance with $\{\pi h(t-\tau)^2+\psi\}$,
  (b) therefore, the instantaneous frequency changes in accordance with $h(t-\tau)$,
  (c) the zero-crossing times depend only on the h,
  (d) the time intervals of the zero-crossings are more shortened as time elapses.

(3) The resonance frequencies and Q values are different very resonator and hence the wave forms of the ringing answer signals are different; however,
  (a) the amplitudes of the ringing components of a ringing answer signal exponentially dump,
  (b) the frequencies of the ringing components change depending only on the $h(t-\tau)$, that is to say, the zero-crossing time is invariable irrespective of change of the resonance frequency of the resonator.

Figure 10:
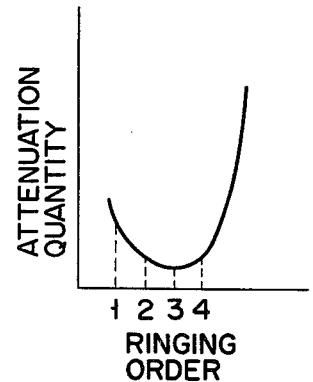
FIG. 10 shows a characteristic of a filter constituting the phase adjusting means shown in FIG. 3.

It is as shown in FIG. 8A that, when the amount of information for object identification narrows, it is difficult to distinctly discriminate respective ringing answer signals. The separator 18 is constructed by a filter which suddenly dumps the ringing components with specific orders, for example, more than fifth order ringing components, taking notice of the exponential dumping of the ringing component of the ringing answer signal wave. In this manner, as shown in FIG. 10, the ringing components of more than the fifth order may be remarkably reduced so that adjacent ringing answer signals may be clearly distinguished, as shown in FIG. 8B. The ringing answer signals thus distinguished by the separation circuit 18 are applied to a binary answer signal extractor 19.

Figure 1:
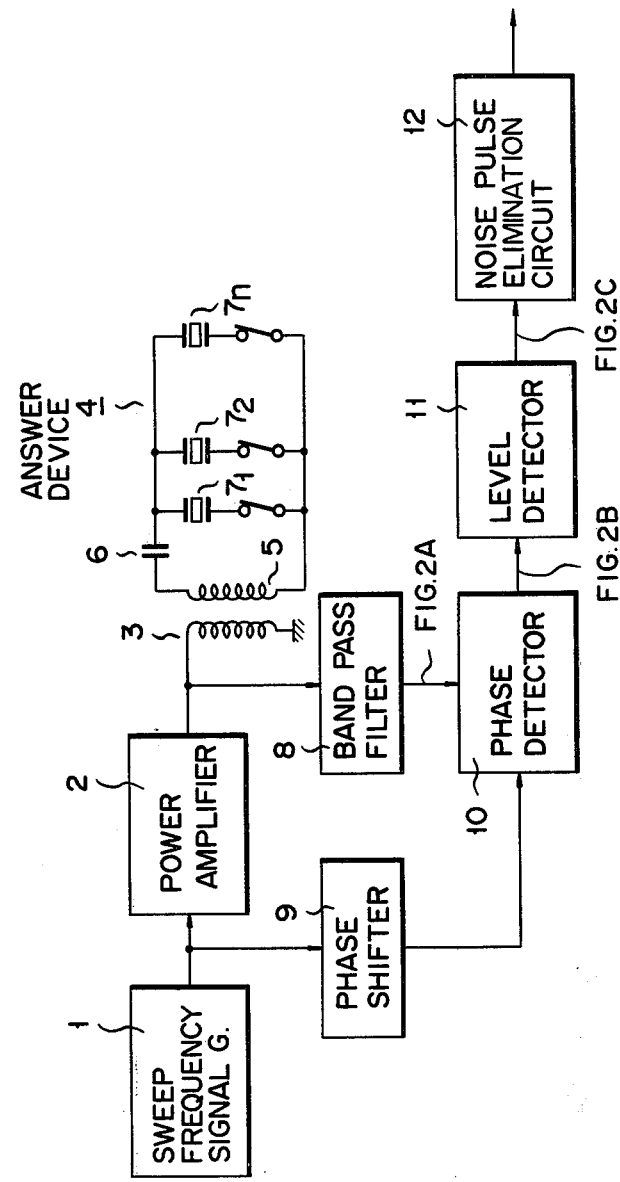
FIG. 1 shows a block diagram of a conventional object identification system.

The extractor 19 includes a level detector 191 and a signal discriminator 192 (FIG. 3). The level detector 19 constructed by, for example, a Schmitt circuit as in the case of the level detector 11 in FIG. 1, converts an input signal, i.e. the separated ringing answer signal (FIG. 8B) into a pulsed answer signal (FIG. 2C). The output signal of the level detector 191 is applied to the signal discriminator 192. The ringing components of higher orders are dumped by the separation circuit 18 and weak noise is considerably removed by the level detector 191. Nevertheless, it is unavoidable that the impulse noise with high amplitude is still mixed with the output of the level detector 191. This disturbs a correct identification of the object.

Figure 11:
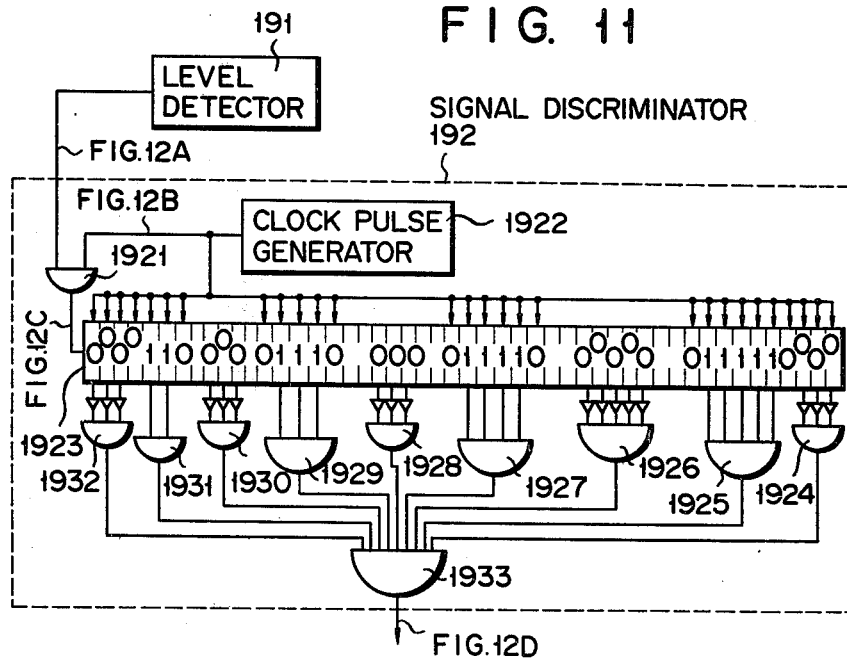
FIG. 11 shows a circuit diagram of one of signal discriminators shown in FIG. 3.

Notable, however, that the noise pulse trains obtained by pulse-converting the impulse noise through the level detector 191 appear at random intervals, while the pulses of the pulsed answer signal (FIG. 2C) by pulsing the ringing answer signal (FIG. 2B) by the level detector 191 appears at predetermined intervals. For example, when the ceramic resonator is used for the answer device 4, pulse number included in the pulsed answer signal corresponding to a resonance answer signal is 4 to 5 during the period approximately 1 to 1.5 ms. The generation intervals of these pulses correspondingly change with the frequency change of the sweep frequency signal with respect to time. On the other hand, the pulse number of the impulse noise is only 1 to 2 during the above time period, and its pulse generation intervals are random. The signal discriminator 192 serves to remove the above-mentioned impulse noise and one form of the details thereof is shown in FIG. 11.

The construction and operation of the signal discriminator 192 shown in FIG. 11 will be given with reference to FIGS. 12A to 12D. The output signal (FIG. 12A) of the level detector 191 is applied to one of the inputs of the AND gate 1921. A clock pulse from a clock pulse generator 1922 is applied to the other input of the same gate 1921. The clock pulse generator 1922 generates high frequency clock pulses with a narrower period than the pulse width $m_4$ of the highest order pulse of the pulsed answer signal. An AND output signal as shown in FIG. 12C is derived from the AND gate 1921 and then is applied to the input of the shift register 1923. The pulsed answer signal (FIG. 12A) has a pulse width space pattern as shown in the figure. In the figure, $m_1$ to $m_4$ indicate pulse widths and $S_1$ to $S_5$ spaces among the pulses. Number of stages of shift registers 1923 is at least the sum of the time intervals of the spaces and pulse widths $S_1, m_1, \ldots S_5, m_4$ of the pulsed answer signal shown in FIG. 12A divided by the period of the clock pulse (FIG. 12B). Since the clock pulse has been applied as the shift pulses to the respective stage of the shift register, the output of the AND gate 1921 is successively shifted.

Since the answer rate of the answer device 4 to the sweep frequency signal is previously set up, the time widths of the respective spaces and pulse widths in the pulse width-space pattern and the generation order of the spaces and the pulses are previously established. In accordance with the pulse width-space pattern (the pulsed answer signal wave form shown in FIG. 12A), the stages of the shift register 1923 are grouped into several specific groups and the AND gates 1924 and 1932 are connected to each group, respectively, as shown. More specifically, as clock pulse trains shown in FIG. 12C are successively shifted to predetermined stages the contents of each stage of the shift register 1923 takes the form of binary "0" and "1", as shown in the figure. To the stage groups corresponding to the spaces $S_1$ to $S_5$ are connected AND gates 1924, 1926, 1928, 1930 and 1932 through inverters. To the stage groups corresponding to the pulse widths $m_1$ to $m_4$ are directly connected the AND gates 1925, 1927, 1929 and 1931, respectively. Accordingly, when the clock pulse trains shown in FIG. 12C are shifted up to a given stage of the shift register 1923, the AND gates 1924 to 1932 produce "1", At this time, the AND gate 1933 produces "1" so that the binary answer signal shown in FIG. 12D is obtained. As described above, the circuit is so designed that the signal discriminator 192 produces "1" only for the pulse train of which the pulse width-space pattern is specified and the "1" is decided as the real answer signal from the answer device 4 and is extracted as the binary answer signal. The pulse train not having the specific pulse width-space pattern is removed as noise. In this manner, the reliability of the object identification performance of the object identification system may be improved. The binary answer signal (FIG. 12D) is supplied to the memory circuit 20.

The memory circuit 20 includes a shift register 201 receiving the binary answer signal and a decoder 202 receiving the output signal of the shift register 201. To the shift register 201 is supplied the timing pulse from the timing pulse generator 134 as shift pulses. The timing pulse is synchronized with the answer timing from the answer device 4. The capacity of the information stored in the shift register 201 is equal to number of the resonators included in the answer device 4. Accordingly, to the shift register 201 are successively stored the information corresponding to the resonators $7_1$ to $7_n$ arranged in the answer device 4. In this manner, the object information corresponding to one sweep period (see T of FIG. 4A) of one answer device 4 are applied to a decoder 202. To the decoder 202 is applied the reference pulse (reference pulses; see FIG. 4A) from the reference pulse decoder 131. Accordingly, the decoder stores the answer information from the answer device 4 each one sweep period in the form of $_5C_2$ code and this code is converted into decimal code for displaying the information, e.g. number, of the object.

From the foregoing description, it will be understood that, in the invention, the phase adjusting means (illustrated in FIGS. 3 as 16) is provided to phase-adjust the phase difference between the resonance answer signal from the answer device 4 and the sweep frequency signal from the interrogation circuit 13 to constantly be 0° or 180°. As a result, the phase of the ringing answer signal always coincides with a given phase over an entire sweep frequency range. Consequently, the continuous impulse wave and the ringing answer signal wave may be distinctly distinguished to give full play to the object identification ability of the system.

The explanation to follow is a modification of the respective constituent components of the system shown in FIG. 3.

MODIFICATION OF SWEEP FREQUENCY SIGNAL GENERATOR

Figure 13:
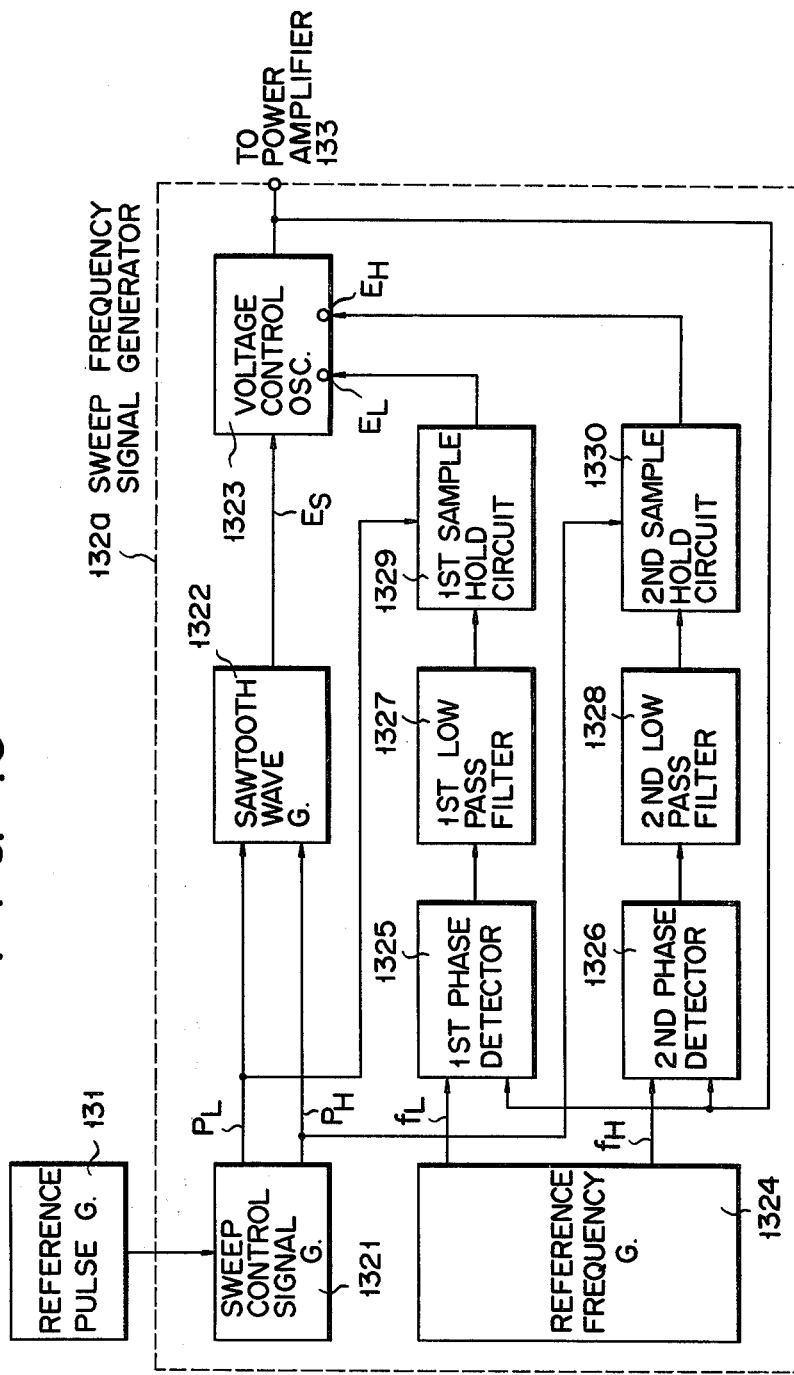
FIG. 13 shows a block diagram of an example of a sweep frequency signal generator in an interrogation circuit shown in FIG. 3.

A modification 132a of the frequency signal generating circuit 132 in FIG. 3 is illustrated in block form in FIG. 13. A conventional means which receives the reference pulse (FIG. 4A) from the reference pulse generator 131 and obtains the sweep frequency signal from the sweep signal generating circuit 132 (FIG. 3) has several ways. One of them is to frequency modulate a carrier wave. Another is to give sawtooth wave to a voltage control oscillator. For the sweep frequency signal, it is necessary that the rate of change of frequency is constant and that both the upper and lower frequencies of the sweep frequency signal is stable. When the sweep frequency signal is obtained by a conventional method, a crystal oscillator is used in order to stabilize the frequency. For this, it is difficult to broaden the sweep frequency range and, therefore, if the frequency range is forcibly broadened, the stability of the frequency is damaged.

To avoid the just mentioned disadvantage, the FIG. 13 example employs a sweep stop period between one sweep period and an ensuing sweep period. During the sweep stop period, a phase synchronizing loop is locked and a fixed frequency output is produced during the locking period. As a result, a stable frequency signal is obtained over a wide frequency range.

In FIG. 13, the reference wave pulse (FIG. 14A) from the reference pulse generating circuit 131 is applied to the sweep control signal generator 1321. The sweep control signals $P_L$ and $P_H$ from the generator 1321 are used to designate the start and stop of the sweep frequency signal, and applied to a sawtooth wave signal generator 1322. The sawtooth wave generating circuit 1322 has a well known construction of a type in which a constant current source is used to charge and discharge a capacitor. A voltage control oscillator 1323 connected to the sawtooth wave generating circuit is so constructed that the rate of the frequency change of the sweep frequency signal is made constant by controlling the frequency modulating sensitivity of the voltage control oscillator by an external control voltage.

The reference frequency generating circuit 1324 outputs the lower limit frequency signal $f_L$ and the upper limit frequency signal $f_H$ of the sweep frequency signal. The lower and upper limit frequency signals $f_L$ and $f_H$ are sequentially applied to first and second phase detectors 1325 and 1326, first and second low frequency filters 1327 and 1328 and first and second sample hold circuits 1329 and 1330, respectively. The outputs of the first and second sample hold circuits are applied to the voltage control oscillator 1323, respectively. The output of the voltage control oscillator 1323 is applied to the power amplifier 133 (FIG. 3) and also fed back to the first and second phase detectors 1325 and 1326. The feeding back forms first and second phase synchronizing loops. The sweep control signals $P_L$ and $P_H$ are applied from the sweep control signal generating circuit 132 to the first and second sampling hold circuits 1329 and 1330, respectively. The first and second phase synchronizing loops may be of analogue or digital type.

In FIG. 13, the sampling times of the outputs of the voltage control oscillating circuit 1323 by first and second phase synchronizing loops are controlled by the sweep control signals $P_L$ and $P_H$ shown in FIGS. 14B and 14C. First, the sweep control signal $P_L$ locks the output frequency of the voltage control oscillator at the sweep lower frequency $f_L$ shown in FIG. 14E during the locking period of the first loop shown in FIG. 14D. During this locking period, the output voltage of the first low pass filter 132 being currently locked is held by the first sampling hold circuit 132. Similarly, the sweep control signal $P_H$ locks the output frequency of the voltage control oscillator 1323 at the sweep upper limit frequency $f_H$ during the second loop locking period. During the locking period, the output voltage of the second low pass filter 1328 in the locking condition is held by the second sampling hold circuit 1330.

More specifically, when the sweep control signal $P_H$ from the sweep control signal generator 1321 is supplied to the sawtooth wave generator 132, the output voltage from the circuit 1322 is fixed at a voltage $e_1$ as shown in FIG. 14D and at the same time the hold of the second loop by the sampling hold circuit 1330 is released. For this, the phase of the sweep upper frequency output $f_H$ from the reference frequency generator 1324 is compared with the phase of the output frequency of the voltage control oscillator 1323 by the second phase detector 1326 of the second phase synchronizing loop. As a result of the comparison, a fixed voltage so as to cancel the phase difference is fed back to the voltage control oscillator 1323, through the second sampling hold circuit 1330 so that the output frequency of the voltage control oscillator 1323 is locked at the sweep upper frequency $f_H$ as shown in FIG. 14E. In other words, when the output terminal voltage $E_s$ of thd sawtooth wave generator 1322 is at $e_1$, it is considered that the voltage at the modulation sensitivity terminal $E_H$ of the voltage control oscillator 1323 is controlled in order that the output frequency of the voltage control oscillator 1323 coincides with the sweep upper frequency $f_H$.

Figure 15A:
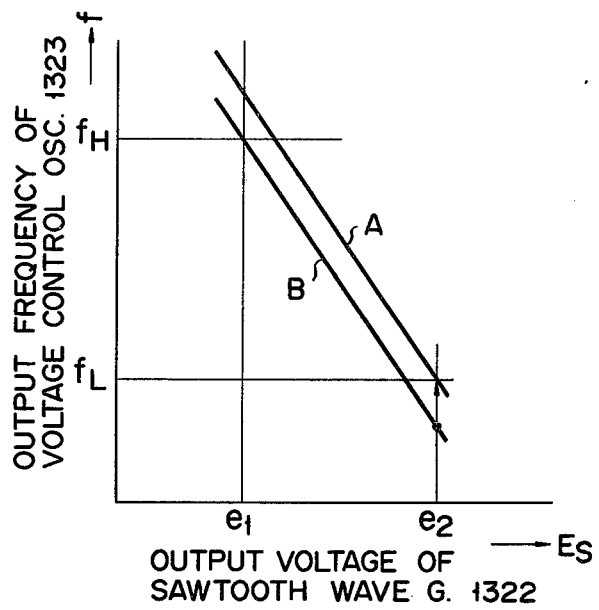
FIGS. 15A and 15B show characteristic curves useful in explaining the operation of the circuit in FIG. 14.
Figure 15B:
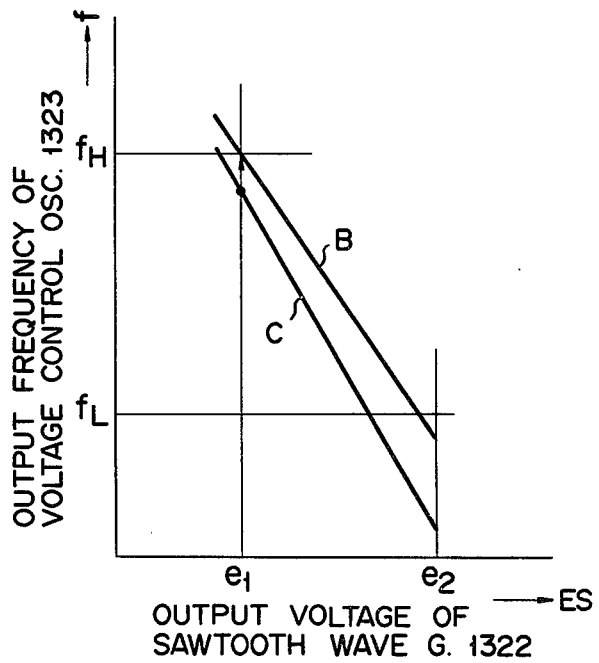

FIGS. 15A and 15B show each the relation of the control voltage value $E_s$ of the control voltage oscillator 1323 vs. the output frequency f of the voltage control oscillator 1323, with a parameter of the voltage $E_H$ of the bias adjusting terminal of the oscillator or the voltage $E_L$ at the frequency control terminal. When the output voltage of the sawtooth wave generator 1322 is $e_1$ as shown in FIG. 15B, a characteristic line C is shifted to a line B passing the sweep upper frequency $f_H$ and the inclination of the line B changes. In the line B condition, when the sweep control signal $P_H$ from the control signal generator 1321 is turned off, the second sampling hold circuit 1330 holds the voltage $e_1$, and releases the second phase synchronizing loop while holding the output characteristic line of the voltage control oscillator 1323 at the line B shown in FIG. 15B.

As the sweep control voltage $P_H$ is turned off, the sweep control signal $P_L$ is turned on. Then, the output voltage $E_s$ of the sawtooth wave generating circuit 1322 is fixed at the voltage $e_2$ and at the same time the holding operation of the first sampling hold circuit 1329 is released. Accordingly, the first phase synchronizing loop locks the output frequency of the voltage control oscillator 1323 at the sweep lower limit frequency $f_L$ of the reference signal generator 1324 while holds the output voltage of the first sampling hold circuit 1329 at a fixed $e_2$. This means that the voltage at the frequency control terminal $E_L$ of the voltage control oscillator 1323 is so adjusted as to make the output frequency of the voltage control oscillator 1323 coincide with the sweep lower limit frequency $f_L$, when the sawtooth wave generating circuit voltage is at $e_2$. Therefore, the output frequency characteristic line B is shifted to the line A passing the point of the sweep lower frequency $f_L$. At this time, the line A is the result of a parallel shift of the line B.

Under the output characteristic line A, when the sweep control signal $P_L$ of the sweep control signal generator 1321 is turned off, the first sampling hold circuit 1329 holds the voltage $e_2$ while at the same time releases the first phase synchronizing loop. At an instant that the sweep control signal $P_L$ is turned off, the sawtooth wave generating circuit 1322 starts its operation to produce a sawtooth wave (FIG. 14D) of which the amplitude gradually decreases from the voltage $e_2$. The sawtooth wave is used to sweep the output frequency of the voltage control oscillator 1323.

During the sweeping period, all the sampling hold circuits for the phase synchronizing loops hold the given voltages. However, when the sweeping period is completed, the sweep control signal $P_H$ is again turned on and the second phase synchronizing loop is locked. As a result, the output voltage $E_H$ (FIG. 13) of the second sampling hold circuit is corrected to permit the above-mentioned operation to be repeated. In this manner, the output frequency of the voltage control oscillator 1323 is sweeped over a fixed range of $f_H$-$f_L$.

The range of the sweep frequency is determined in the above-mentioned manner. An alternation of this is possible in which, at the operating time of the respective phase synchronizing loops, the output frequency of the voltage control oscillator is corrected by directly controlling the sawtooth wave generator 1322. In this case, the first and second sampling hold circuits 1329 and 1330 may be omitted. In this case, an ordinary phase synchronizing loop using an active low pass filter having an amplifier with weak input leak current may be used. When the locking period of the output frequency of the voltage control oscillator 1323 is ended, the active low pass filter is turned off to hold the control voltages $e_1$ and $e_2$ at the locking time in the active low pass filter.

As described above, in the sweep frequency generator 132a shown in this example, when the sawtooth wave to sweep the frequency is applied to the voltage control oscillator 1323, the sweep stop periods are used at the upper and lower limits of the sawtooth wave amplitude (FIG. 14D). During this stop period, the phase synchronizing loop is locked at the output frequency of the voltage control oscillator 1323 and the output frequency and the modulation sensitivity of the voltage control oscillator are controlled through the terminals $E_L$ and $E_H$. In this manner, the sweep frequency signal stable over a wide frequency range may be supplied.

MODIFICATION OF ANSWER DEVICE

A modification of the answer circuit is shown in FIG. 16, and generally noted by 4a. In FIG. 16, $L_o$ represents an inductance of the answer antenna 5. $C_o$ represents a capacitance of a capacitor 6 connected in series with the answer antenna 5. $X_1$ to $X_n$ designate impedances of resonators $7_1$ to $7_n$, respectively. The inductance of a compensating inductor $4_1$ connected in parallel with the resonators $7_1$ to $7_n$ is denoted as $L_c$.

In the answer device 4a, even if the resonance resistor of resonators $7_1$ to $7_n$ and the Q (quality factor) of the same are equal, respectively, the resonance resistance and the Q of the answer device 4a have frequency characteristics within the sweep frequency range. Particularly, when the inductor $4_1$ is not inserted or when values of the capacitance and the inductance of the capacitor 6 and the inductor $4_1$ particularly are not taken into account even if the inductor $4_1$ is inserted, the frequency characteristic change mentioned above is remarkable. This will be described in detail later.

Figure 17:
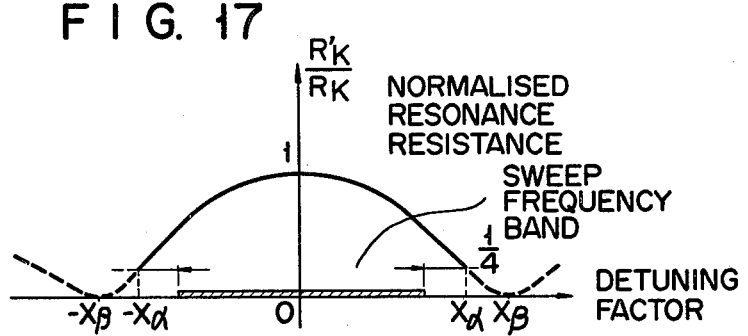
FIG. 17 shows a relation between normalized resonance resistance and detuning factor of the device shown in FIG. 16.
Figure 18:
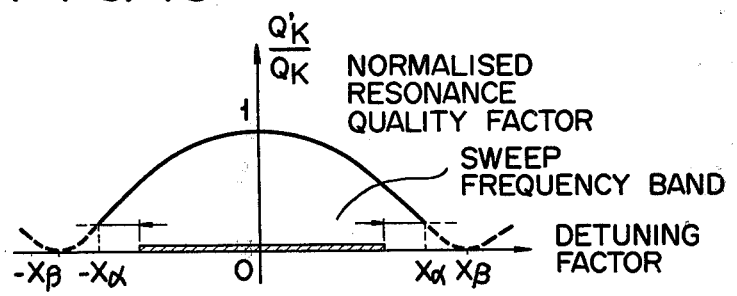
FIG. 18 shows a relation between normalized resonance Q and detuning factor of the device in FIG. 16.

As previously state, the ringing answer signal wave fed from the answer device 4 (FIG. 3) is expressed in the equation (1) in the object identification system of the invention. In the equation (1), it is apparent that the time constant determining the dumping of the amplitude relates to Q and that the coefficient A actually relates to the Q of the resonator and the resonance resistance thereof. Accordingly, when the Q's and the resonance resistances of the resonators are remarkably uneven in the values over the sweep frequency range used, the wave forms (FIG. 9) of the ringing answer signal are uneven in shape. Accordingly, it is as a matter of course that even if these uneven ringing answer signal wave forms processed, it is impossible to obtain a correct answer signal (for example, the binary answer signal shown in FIG. 12D). The answer device 4a shown in FIG. 16 eliminates such the disadvantage. In this example, the capacitance of the capacitor 6 is selected so that the resonance frequency of a series circuit including a capacitor 6 and an answer antenna 5 coincides with the center frequency of the frequency band of the sweep frequency signal used. Additionally, the inductance $L_c$ of the inductor $4_1$ is so selected that the resonance frequency of a parallel resonance circuit including the sum of the parallel capacitances of the resonators $7_1$ to $7_n$ and the industance $L_o$ of the answer antenna 5, coincides with the center frequency of the frequency band of the sweep frequency signal used. If the answer device 4a is constructed on the basis of the above-mentioned features, the normalized resonance resistance and the normalized resonance Q is a resonance frequency may be positioned symmetrically with respect to the center frequency within the upper and lower frequencies of the sweep frequency band used, as shown in FIGS. 17 and 18.

For a better understanding of the answer device 4a shown in FIG. 16, the characteristic of the resonating system will be analized. Notations used in the following analizing of the characteristic will be given below.

Figure 21:
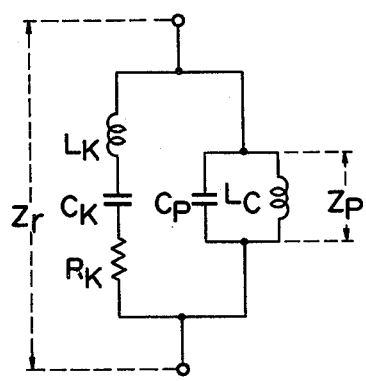
FIG. 21 shows an equivalent circuit of the impedance of the FIG. 16 circuit as viewed to the right from a plane a-a' in the vicinity of the Kth resonance point.

| No. | Symbol | Contents |
|---|---|---|
| 1 | $C_K$ | Capacitance of a single resonator |
| 2 | $C_o$ | Capacitance of a capacitor 6 of the answer device 4a shown in Fig. 16 |
| 3 | $C_p$ | Sum of parallel capacitances of resonators in the answer device 4a (Fig. 16) |
| 4 | $C_{pK}$ | Parallel capacitances of a single resonator (Fig. 16) |
| 5 | $I_m(Z_K)$ | Imaginary part of $Z_K$ (No. 31) |
| 6 | $I_m(Z_r)$ | Imaginary part of $Z_r$ (No. 34) |
| 7 | $I_m(Z_l)$ | Imaginary part of $Z_l$ (No. 35) |
| 8 | $L_c$ | Inductance of the inductor $4_1$ (Fig. 16) |
| 9 | $L_K$ | Inductance of a single resonator ($7_1$ to $7_n$) |
| 10 | $L_o$ | Inductance of the answer antenna 5 (Fig. 16) |
| 11 | $Q_K$ | Q of the Kth resonator $7_K$ (FIG. 16) |
| 12 | $Q'_K$ | Q when the Kth resonator $7_K$ (Fig. 16) is assembled into the answer device 4a |
| 13 | $R_e(Z_K)$ | Real part of $Z_K$ (No. 31) |
| 14 | $R_e(Z_r)$ | Real part of $Z_r$ (No. 34) |
| 15 | $R_K$ | Resonance resistance when the Kth resonator $7_k$ (Fig. 16) is presented in a single |
| 16 | $R'_K$ | Resonance resistance when the Kth resonator $7_K$ (Fig. 16) is assembled into the answer device 4a |
| 17 | $\omega$ | Angular frequency |
| 18 | $\omega_0$ | Resonance angular frequency determined by $L_o$ (No.10), $C_o$ (No. 2) or $L_c$ (No. 8), $C_p$ (No. 3) and expressed by an equation (25) |
| 19 | $\omega_K$ (K=1, 2...) | Resonance angular frequency when the Kth (Fig. 16) resonator is presented in a single and expressed by equation (4) |
| 20 | $\omega'_k$ (K=1, 2...) | Resonance angular frequency when the Kth resonator $7_K$ (Fig. 16) is assembled into the answer device 4a |
| 21 | $\omega_\alpha$ | Resonance angular frequency determined by $L_o$ (No. 10), $C_p$ (No. 3) and expressed by the equation (28) |
| 22 | X | Detuning factor for the resonance angular frequency $\omega_0$ (No. 18) amd expressed by an equation (27) |
| 23 | $X_\alpha$ | Quantity given by the equation (29) |
| 24 | $X_\beta$ | Quantity given by an equation (30) |
| 25 | $X_K$ | Detuning factor for the resonance angular frequency $\omega_K$ (No. 19) and expressed by the equation (30) |
| 26 | $X_{KS}$ | Quantity corresponding to the resonance frequency of the answer device 4a |
| 27 | $X_{Kr}$ | Quantity corresponding to the anti-resonance frequency of the answer device 4a (Fig. 16) |
| 28 | $X_o$ | Reactance component of the impedance $Z_o$ (No. 32), i.e. $X_o = Z_o/j$ |
| 29 | $X_p$ | Reactance component of the impedance $Z_p$ (No. 33), i.e. $X_p = Z_p/j$ |
| 30 | $X_{pK}$ | Reactance of the capacitance capacitance of a single resonator, i.e. expressed by the equation (6) |
| 31 | $Z_K$ | Equivalent impedance of a single resonator |
| 32 | $Z_o$ | Impedance as viewed to the right from a-a' plane |
| 33 | $Z_p$ | Impedance of a parallel resonance circuit including $C_p$ (No. 3) and $L_c$ (No. 8) in Fig. 21 |
| 34 | $Z_r$ | Impedance as viewed to the right from a-a' plane |
| 35 | $Z_l$ | Loop impedance (as viewed from a point of $L_o$ side) of the answer device 4a |

Figure 19:
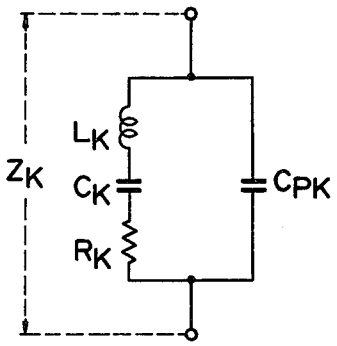
FIG. 19 shows an equivalent circuit of a single resonator shown in FIG. 16 operating at a frequency in the vicinity of the resonating point.

The impedance of a single resonator will be given. The equivalent circuit of a single resonator in the vicinity of the resonance point is depicted as in FIG. 19. The impedance $Z_K$ of the circuit is given by the equation (2)

$$Z_K = X^2_{pK} \cdot \frac{R_K}{R_K^2 + (Q_K R_K X_K + X_{pK})^2}$$
$$-j\{X^2_{pK} \cdot \frac{Q_K R_K X_K + X_{pK}}{R_K^2 + (Q_K R_K X_K + X_{pK})^2} - X_{pk}\} \quad (2)$$

where $$X_K = \frac{\omega}{\omega_K} - \frac{\omega_K}{\omega} \quad (3)$$

$$X_K = \frac{1}{\sqrt{L_K C_K}} \quad (4)$$

$$Q_K = \frac{\omega_K L_K}{R_K} \quad (5)$$

$$X_{pK} = \frac{1}{\omega C_{pK}} \quad (6)$$

From the equation (2), we obtain equations (7) and (8)

$$R_e(Z_K) = X^2_{pK} \cdot \frac{R_K}{R_K^2 + (Q_K R_K X_K + X_{pK})^2} \quad (7)$$

$$I_m(Z_K) = -X^2_{pK} \cdot \frac{Q_K R_K X_K + X_{pK}}{R_K^2 + (Q_K R_K X_K + X_{pK})^2} + X_{pk} \quad (8)$$

In the vicinity of the resonance point ($X_K = 0$), an equation (9) holds $$\left.\begin{array}{l} X_{pK} >> Q_K R_K X_K \\ |Q_K R_K X_K + X_{pK}| >> R_K \end{array}\right\} \quad (9)$$

An equation (10) holds over an entire sweep frequency range $$X_{pK} >> R_K \quad (10)$$

Therefore, we rewrite the equation (8) to an approximation equation (11)

$$I_m(Z_K) \cong -X^2_{pK} \cdot \frac{1}{Q_K R_K X_K + X_{pK}} + X_{pK} \quad (11)$$

Figure 20:
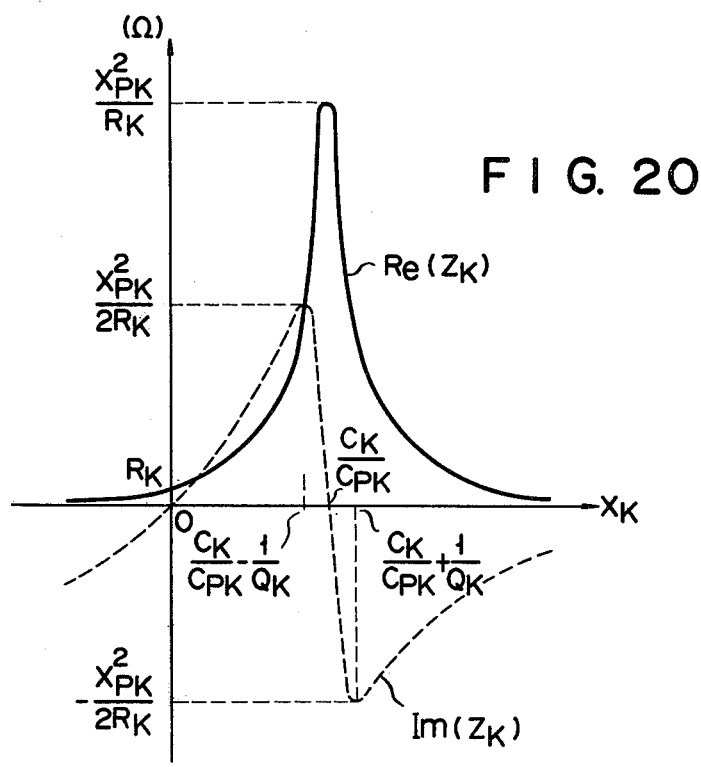
FIG. 20 shows a characteristic curve of a single resonator in FIG. 16 operating at a frequency near the resonating point.

The frequency characteristics of $R_e(Z_K)$ and $I_m(Z_K)$ in the vicinity of the resonance point are plotted as shown in FIG. 20.

The resonance frequency $\omega_R$ of the answer device 4a will be described. The impedance as seen to the right from a-a' plane in FIG. 16 is designated by $Z_r$. It is considerable that the resonator is a capacitor except the resonance point. Accordingly, the impedance $Z_r$ may be given by the equivalent circuit shown in FIG. 21. When the equivalent circuit shown in FIG. 21 is compared with that of the FIG. 19, $L_K$, $C_K$ and $R_K$ are unchanged between them but $C_p$ in FIG. 21 is the sum of $C_{pK}$'s of the respective resonators in FIG. 19. That is, $C_p$ is given $$C_p = \sum_{n=1} C_{pK} \quad (12)$$

In FIG. 21, the impedance of the parallel resonance circuit including $C_p$ and $L_c$ is denoted as $Z_p$. When the loss of $Z_p$ is neglected, $Z_p$ is given by an equation (13)

$$Z_p \cong jX_p \quad (13)$$

The reactance of the $Z_p$ is given by an equation (14)

$$X_p = -\frac{L_c}{C_p} \cdot \frac{1}{\omega L_c - \frac{1}{\omega C_p}} \quad (14)$$

The impedance $Z_r$ is given by an equation (15) if $X_p$ in place of $X_{pK}$ is used in the equation (2).

$$Z_r = X_p^2 \cdot \frac{R_K}{R_K^2 + (Q_K R_K X_K + X_p)^2}$$
$$-j\{X_p^2 \cdot \frac{Q_K R_K X_K + X_{pK}}{R_K^2 + (Q_K R_K X_K + X_p)^2} - K_p\} \quad (15)$$

The impedance $Z_o$ as seen to the left from a–a' plane in FIG. 16 is expressed $$Z_o = j(\omega L_o - 1/\omega C_o) = jX_o \quad (16)$$

Figure 22:
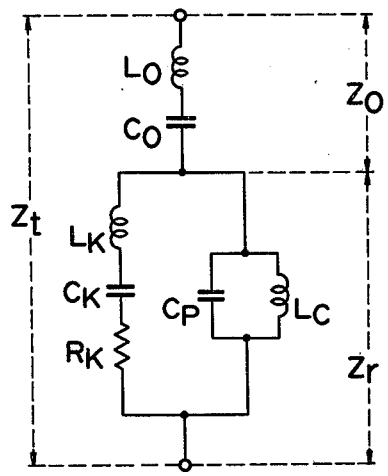
FIG. 22 is an equivalent circuit of a loop impedance of the answer device shown in FIG. 16.

In this equation, the loss resistance of the answer antenna (5) is neglected because it is very small. The loop impedance $Z_t$ as seen from a point at $L_o$ side in the answer device 4a in FIG. 16 may be expressed by an equivalent circuit shown in FIG. 22. Therefore, the $Z_t$ is expressed by an equation (17)

$$Z_t = Z_o + Z_r \quad (17)$$

The resonance point of the answer device 4a is $$I_m(Z_t) = 0 \quad (18)$$

From the equations (15), (16) and (18), we obtain $$-X_p^2 \cdot \frac{Q_K R_K X_K + X_{pK}}{R_K^2 + (Q_K R_K X_K + X_p)^2} + X_p + X_o = 0 \quad (15)$$

In the equation (19), the resonance frequency $X_K$ of the answer device 4a is given by an equation (20) (in this case $X_K$ is denoted by $X_{KS}$)

$$X_{KS} \cong -\frac{1}{Q_K R_K} \cdot \frac{X_p X_o}{X_p + X_o} \quad (20)$$

where K=1, 2, . . . n. Since $R_e(Z_t)$ is at maximum, the anti-resonance point $X_K$ (in this case $X_K$ is denoted by $X_{Kp}$) is expressed by an equation $$X_{KP} \cong -\frac{X_p}{Q_K R_K} \quad (21)$$

where K=1, 2, . . . n. $X_o$ and $X_p$ are considered constant near the resonance point since the change of these is gentle. As shown in FIGS. 23A and 23B, the positions of the resonance point $X_{KS}$ and the anti-resonance point $X_{Kr}$ are inversed depending on the polarity of $X_p$. This fact is very convenient when the resonance resistance of the answer device 4a is restrained low.

The resonance resistance $R'_K$ of the answer device 4a will be given. The resistance component of the $Z_t$ is $R_e(Z_t)$ from the equation (17). However, in the equation (17), $Z_o$ is a pure reactance and hence $R_e(Z_t)$ is equal to $R_e(Z_r)$ and $R_e(Z_t)$ is expressed by an equation (22)

$$R_e(Z_t) = X_p^2 \cdot \frac{R_K}{R_K^2 + (Q_K R_K X_K + X_p)^2} \quad (22)$$

Therefore, the resonance resistance $R'_K$ of the answer device 4a is obtained by putting the $X_{KS}$ in the equation (20) into the $X_K$ in the equation (22) and is expressed by an equation (23)

$$R'_K \cong R_K(1 + \frac{X_o}{X_p})^2 \quad (23)$$

In the system of the invention, it is of very significance to lower the resonance resistance of the answer device as possible. As seen from the equation (23), the following equation (24) is the necessary and sufficient condition in order to curb low the resonance resistance of the answer device.

$$-2 < X_o/X_p < 0 \quad (24)$$

In order to restrain the deviation of the resonance frequency small, as shown in FIG. 24, the resonance point $\omega_o$ of the $X_o$ per se is desirably positioned at the center of the frequency band used. For satisfaction of the condition in the equation (24), $X_p$ must be
When $\omega > \omega_o$, $X_p < 0$
When $\omega < \omega_o$, $X_p > 0$
As seen from this condition, the resonance point of $X_p$ must be equal to that of $X_o$ and its reactance must be that of the parallel resonance circuit. It is for this reason that the compensating inductance $4_1$, i.e. $L_c$, is used in the answer response device 4a. The value of $L_c$ is so selected as to satisfy the following equation (25).

$$1/\sqrt{L_o C_o} = 1/\sqrt{L_c C_p} = \omega_o \quad (25)$$

The relation between $X_p$ and $X_o$ is shown in FIGS. 23A, 23B and FIG. 24.

By putting the equations (14) and (16) into $X_p$ and $X_o$ in the equation (23), $R'_K$ is $$R'_K \cong R_K(1 - \frac{\omega_o^2}{\omega_a^2} X^2)^2 \quad (26)$$

where
$$X = \omega/\omega_o - \omega_o/\omega \quad (27)$$

$$\omega_a = 1/\sqrt{L_o C_p} \quad (28)$$

The graph of the $R'_K$ is illustrated in FIG. 17. In FIG. 17, $X_\alpha$ and $X_\beta$ are expressed $$X_\alpha = \frac{1}{\sqrt{2}} \frac{\omega_a}{\omega_o} \quad (29)$$

$$X_\beta = \frac{\omega_a}{\omega_o} \quad (30)$$

FIG. 17 indicates that the resonance resistance $R'_K$ of the answer device 4a is smaller than the specific resonance resistance $R_K$ of the resonator within entire sweep frequency band.

The Q of the answer device 4a will be described. Since the answer device 4a is comprised of a plurality of resonating system, Q's at the resonance points of the respective resonating systems may be defined. The definition is very important when the resonance answer signal waves are detected through the sweeping of a plurality of resonating systems. With respect to the resonating point of the answer device 4a, since the answer device is not a simple single tuning circuit, it is impossible to use the known definition of Q. For this, the present invention uses the following approximation. That is, Q of the answer device 4a is the result of dividing the first derivative coefficient $d/dX_K$ with respect to the reactance X at each resonance point of the resonating systems by the resonance resistance $R_K$ of the resonator. For example, the resonance point $Q'_K$ of the Kth resonator is expressed by the following equations $$Q'_K \equiv [\frac{1}{R_K} \frac{d}{dX_K} I_m(Z_i)] X_K = X_{KS}$$

$$\approx Q_K (1 + \frac{X_o}{X_p})^2 \quad (31)$$

$$< Q_K (1 + \frac{\omega_a}{\omega_o} X^2)^2 \quad (32)$$

The frequency characteristic of $Q'_K$ calculated by the equations (31) and (32) is shown in FIG. 18.

As shown in FIGS. 17 and 18, when the compensating inductor $4_1$ is inserted in the answer device 4a, Q's and the resonance resistances of the respective resonators are uniform over the entire sweep frequency band, that is to say, these are symmetrical with respective to the center frequency. Therefore, this example can successfully eliminate the disadvantage that it fails to obtain the resonance answer signal including the ringing answer signal.

MODIFICATION OF SEPARATOR

The separation circuit 18 (FIG. 13) may be modified into a separation circuit 18a as shown in FIG. 25. This modification permits a number of resonators to be inserted within the frequency band of a fixed sweep frequency signal.

In FIG. 25, a ringing answer signal (FIG. 2B) derived from the detector 17 is compressed into a single impulse wave. The result of this is: the amount of information from the answer device 4 swept by a sweep frequency signal within a sweep frequency range is increased; the interference between adjacent ringing answer signals produced when the interval between the resonance frequencies of a plurality of resonators is removed; S/N ratio (answer signal/noise) is remarkably improved; the information for identifying an object are increased. Referring again to FIG. 25, the output signal (FIG. 26A) of the detector 17 is applied to a filter 181. An ordinary band pass filter may be used for the filter. The filter 181 dumps noise components with higher frequencies included in the output signal of the detector 17 to permit the ringing components to pass therethrough. When the noise component with lower frequencies included in the output signal of the detector 17 is small, the band pass filter may be replaced by a low pass filter.

When the intervals between the resonance frequencies of the resonators are wide, the output of the filter (having no overlapping portions between adjacent ringing components) is as shown in FIG. 26B. However, when the intervals between the resonance frequencies of resonators are narrow, adjacent ringing answer signals partly overlap as shown in FIG. 26C. When the ringing answer signals as shown in FIG. 26C are applied to the level detector 191 (FIG. 3) without any modification, it is impossible to obtain the pulsed answer signal (FIG. 12A) with a given pattern.

As stated previously, a ringing answer signal wave which is formed by detecting a resonance answer signal (see FIG. 2A) resulting from sweeping resonators with high Q which are made of ceramic or crystal, is such that the frequency thereof increases with time. The output of the filter 181 is applied to the compressor 182. The signal compressor 182 is constructed by a matching filter, for example, and has a group delay time—frequency characteristic that the frequency components of an input signal having a predetermined frequency-time characteristic are made to coincide on a time scale. That is to say, the compressor converts an input signal thereto into an impulse with a large amplitude (i.e. with good S/N). The signal compressor 182 may be constructed by a plurality of equivalent delay circuits as shown in FIG. 27, which are connected in cascade fashion. In FIG. 27, $V_i$ indicates in input voltage; $V_0$ an output voltage, A an operation amplifier, R, $R_G$, $R_F$, R/2 and 2R/r resistors; C, 2C, r/2C capacitances. The transfer function of the circuit shown in FIG. 27 is given $$\frac{V_o}{V_i} = \frac{S^2 - \frac{\omega_o}{Q} S + \omega_o^2}{S_2 + \frac{\omega_o}{Q} S + \omega_o^2}$$

where $$\omega_o = \frac{1}{RC}$$

$$1/Q = \mu (r + 4)$$

$$r = \frac{1}{2} (\frac{1}{Q} - 4 + \sqrt{\frac{1}{Q^2} + \frac{24}{Q} + 16}$$

$$\mu = \frac{R_F}{R_G} = \frac{r}{r + 8}$$

The delay time $\tau$ of the circuit shown in FIG. 27 is $$\tau = \frac{\frac{2Q}{\omega_o} (1 + \frac{\omega^2}{\omega_o^2})}{\frac{\omega^2}{\omega_o^2} + Q^2(1 - \frac{\omega^2}{\omega_o^2})^2}$$

where $\omega$ is an angular velocity of the output frequency f, $2\pi f$. The delay characteristic of the delay circuit shown in FIG. 27 is determined by $\omega_0$ and Q, and its delay characteristic is shown in FIG. 28. The gain of the circuit shown in FIG. 27 is $$|V_o|/|V_i| = 1$$

Accordingly, a delay characteristic of a signal delay circuit shown in FIG. 27 is represented by a curve shown in FIG. 28. A plurality of delay circuits each with such a delay characteristic are connected in cascade fashion in such a manner that the delay circuits are arranged with successively and slightly different delay characteristics. If so arranged, the overall frequency-delay characteristic of the delay circuit is as indicated by a continuous line in FIG. 29, which is a desirable one.

The example mentioned above was such a case that the active filter shown in FIG. 27 was used for the compressor 182 shown in FIG. 25. However, the compressor 182 may be constructed by properly combining inductors and capacitors, or by using a CCD (charge coupled device).

Figure 30A:
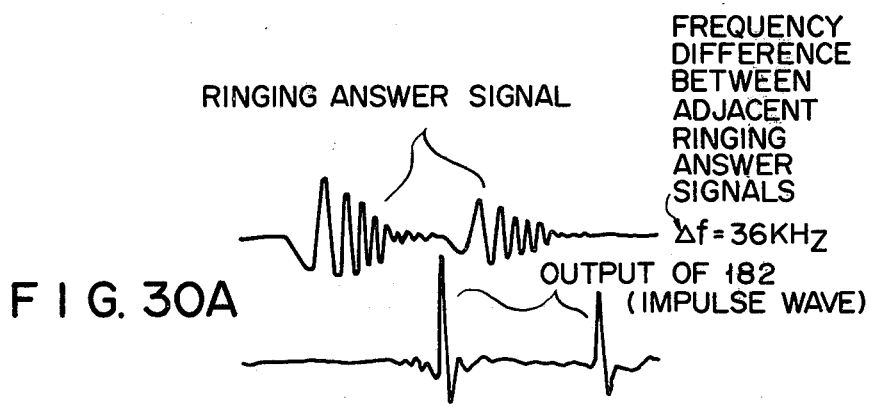
Figure 30B:
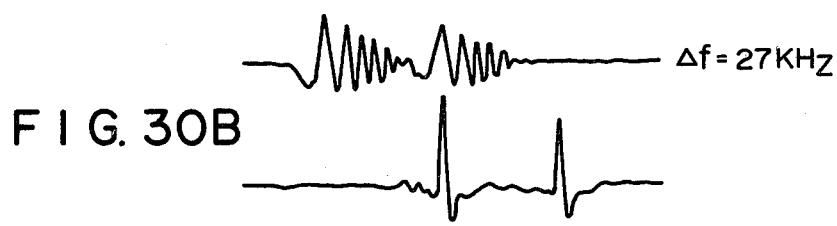
Figure 30C:
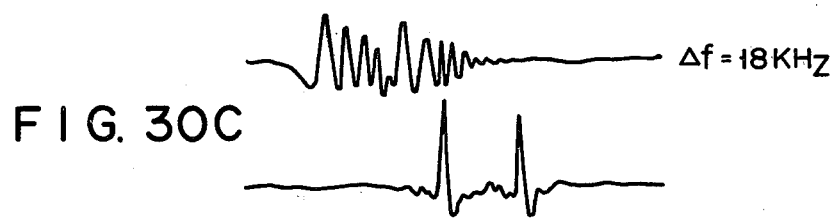
Figure 30D:
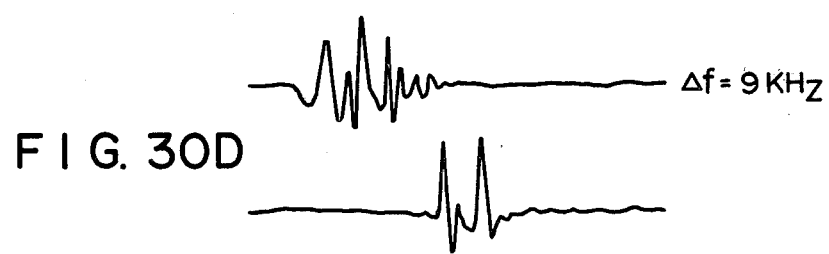
Figure 30E:
Figure 30F:
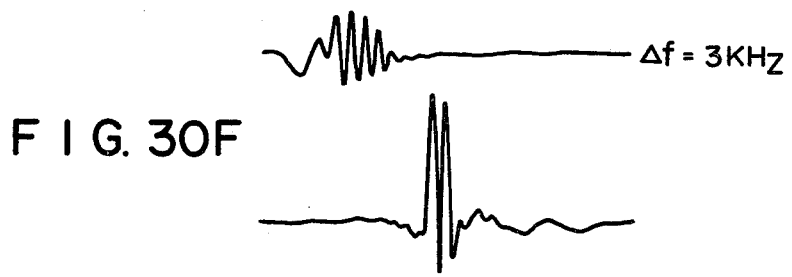

As described above, the signal compressor 182 (FIG. 25) produces a single impulse wave when it receives a ringing answer signal. Wave forms shown in FIGS. 30A to 30F illustrate the relation between the input and output signals of the signal compressor 182. $\Delta f$ indicates the frequency intervals between adjacent ringing answer signals. In even such a case where frequency difference $\Delta f$ between adjacent two ringing answer signals is of the order of 3 KHz and the ringing components overlap to each other to a relatively great extent, as shown in FIG. 30F, it may extract an impulse wave corresponding to each ringing answer signal. The wave forms shown in FIGS. 30A to 30F are obtained when the sweep period is 9 ms. In FIGS. 30A to 30C, two ringing answer signals do not overlap each other on the time scale, but, in FIGS. 30D to 30F, the ringing components partly overlap each other. It is to be noted here that if the impulse wave is inputted to the signal compressor 182, the compressor produces an inverse ringing signal, as shown in FIG. 31B; however, the compressor produces white noise when it receives a white noise light.

As described above, the signal compressor 182 has such a "frequency-time delay characteristic" that the frequency components of the input signal having a given "time-frequency characteristic" are made to coincide on the time scale, and converts the input signal into one impulses wave. In this manner, ringing answer signals are converted one by one into an impulse wave and converted impulse wave train is guided into the level detector 191 (FIG. 3) in the binary answer signal extractor 19 where they are pulsed. The pulsed output signal is delivered to the signal discriminator 192 where the pattern of the input signal thereto is checked to see if the input signal is the desired one or noise. When the signal decision circuit as shown in FIG. 11 is used, it is satisfactory merely by replacing the gate circuits connected to the outputs of the respective stages of the shift register 1923 by proper ones. More precisely, only the group of given stages produce "1", corresponding to the output "1" of the level detector 191 corresponding to one impulse wave, and the remaining stages produce "0". In this case, even if the impulse noise is included in the resonance answer signal train, and the impulse noise is converted by the signal compressor 182 into pseudo-ringing signals which in turn are pulsed by the level detector 191, since the output pattern of the respective stages have been established as the pattern corresponding to the output of the signal compressor 182 corresponding to the normal ringing answer signal, the binary answer signal extractor 19 does not produce "1" output for the noise received.

In the output of the signal compressor 182, the level of the output impulse wave corresponding to the normal ringing answer signal is much larger than the level of the output impulse wave corresponding to the pseudo-ringing signal produced by noise. Therefore, if the detecting level of the level detector 191 is set up at a high level, it is possible to separate the normal ringing answer signal from noise, only by using the output of the level detector 191. That is, the signal discriminator 192 may be omitted.

The signal discriminator 192 (FIG. 3) is not limited to the one 192a shown in FIG. 11. Any type circuit is applicable for this discriminator if it can detect the fact that the pulse width and the time space or interval between the pulses of the pulsed answer signal (FIG. 2C) pulseconverted from the ringing answer signal (FIG. 2B) have a predetermined regular pattern. As described above, when the signal compressor 182 is used in the separator circuit 18a, as shown in this example, even if the resonance frequency intervals of the resonators are narrowed, i.e. number of the resonators is increased, noise may be effectively removed.

MODIFICATION OF BINARY ANSWER SIGNAL EXTRACTOR

There is a possibility that the pulse width and the pulse interval of the pulse answer signal slightly change due to the phase shift and the change of signal level of a whole object identification system. In order to correctly detect the normal resonance answer signal irrespective of such changes, it is preferable to use the signal discriminator 192b shown in FIG. 32. The difference of the binary answer signal extractor 19a shown in FIG. 32 from that in FIG. 11 is only the signal discriminator, and hence a description to be made will proceed about the signal discriminator alone. In FIG. 32, a shift register 1923 comes in the storing condition when the clock pulse train forming a pattern corresponding to the normal pulsed answer signal is shifted up to the given stages, as in the case of FIG. 11. A memory 1934 stores all the pulse width-space patterns changed within a tolerable range due to the phase shift and the level change of the whole system. Therefore, it produces parallel bits corresponding to the parallel bits of the shift register 1923. FIG. 33A illustrates a standard pattern of the pulsed answer signal outputted from the level detector 191. For $m_1$ to $m_4$ and $S_1$ to $S_5$, refer to the description of FIG. 12. FIG. 33B shows a maximum tolerable phase-advance pattern. FIG. 33B shows a maximum permissible phase-lag pattern. Each bit output of the shift register 1923 and each bit output of the memory 1934 are correspondingly applied to a coincident circuit 1935. When a parallel bit output pattern from the shift register 1923 and the same of the pattern stored in the memory 1934, coincide to each other, the coincident output is outputted as the binary answer signal to be applied to the memory 20 (FIG. 3). When the pulsed answer signal from the level detector 191 suffers from the phase shift or the level change, the pattern of the pulsed answer signal coincides with any one of the patterns stored in the memory 1934 and therefore the binary answer signal to be outputted is outputted without fail. As a consequence, extremely low is a possibility that some impulse noise patterns coincide with the patterns stored in the memory 1934 and the erroneous binary signal is applied as the normal binary answer signal to the memory 20.

ANOTHER MODIFICATION OF BINARY ANSWER SIGNAL EXTRACTOR

A binary answer signal extractor 19b shown in FIG. 34 aims at eliminating noise by using the fact that the answer device 4 is repeatedly swept at a fixed period and the resonance answer signal is produced at a fixed period. The true resonance answer singal is periodically produced at a predetermined time in response to the sweep period. On the other hand, the generation interval of noise is at random, i.e. not periodic. This example is constructed on the basis of this difference of the signal generating time.

Referring again to FIG. 34, the output signal of the separating circuit 18 is applied directly to one of the inputs of a multiplier 194 and to the other input of the same, through a delay circuit 193. In this case, the delay time of the delay circuit 193 is selected to be the same as the repetitious period of one sweep or that of a plurality of sweeps of the answer device 4. Although one sweep period T differs depending on the width of the frequency range of the sweep frequency signal, it is ordinarily selected to be several tens ms. The frequency range of the spectrum of the output signal of the separation circuit 18 is approximately 1 to 10 KHz. Therefore, the delay circuit giving a delay time of several tens ms may be constructed by a plurality of balancing circuits including inductors and capacitors as shown in FIG. 35. Alternately, CCD may also be used for the delay circuit. A multiplier 194 may be constructed by a balanced modulator such a ring modulator and produces the product of the non-delay signal from the separation circuit 18 and the delayed signal of one sweep period from the delay circuit.

Figure 36E:
Figure 36F:
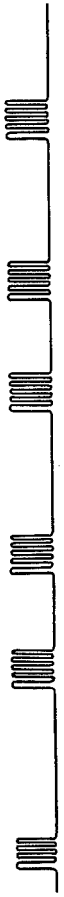

The operation of the binary answer signal extractor 19b will be described referring to FIGS. 34 and 36. FIG. 36A shows a sweep frequency signal (the output of the interrogation circuit 13 in FIG. 13) for sweeping the answer device 4 through the frequency changing from $F_1$ to $F_n$ during the sweeping period T. The sweep frequency signal $F_1$ to $F_n$ is radiated as an interrogation signal toward the answer device 4. Upon receipt of the interrogation signal, the answer device 4 radiates back the resonance answer signal to the transmitter. In the transmitter, the resonance answer signal is detected and the ringing answer signals included in the answer signal are separated by the separator 18 (FIG. 3). These ringing answer signals denoted as $S_{a1}$ to $S_{a3}$ and $S_{b1}$ to $S_{b3}$ are illustrated in FIG. 36B. In the figure, $N_1$ and $N_2$ are noise. The order of the sweep periods are noted as $T_1$, $T_2$ and $T_3$. The ringing answer signals corresponding to two resonators in the answer device 4 are designated by $S_a$ and $S_b$, respectively. Assume that random noise $N_1$ and $N_2$ included in the receiving signal are included in the sweep periods $T_1$ and $T_2$. Signal trains shown in FIG. 36C are that the signal trains shown in FIG. 36B are applied to the multiply circuit 194, through the delay circuit 193 (FIG. 34). Notable here that the ringing answer signal appears at the same position and with the same wave shape on the time scale every sweep period, while the appearing time and wave shape of the noise signal are unstable. The result of the multiplication of both the inputs in the multiplier 194 is shown in FIG. 36D. In the multiplier, $S_{a1}$ (FIG. 36C) is multiplied by $S_{a2}$ (FIG. 3B) and $S_{b1}$ (FIG. 36C) by $S_{b2}$ (FIG. 36B) so that the output signal of the multiplier has twice frequency (FIG. 36D). On the contrary, the noises $N_1$ and $N_2$ do not coincide in phase in FIGS. 36B and 36C so that these are not produced from the multiplier. That is, these do not appear at the output of the multiplier in the periods $T_2$ and $T_3$ in FIG. 36B. Since, the signal wave form shown in FIG. 36D includes a DC component, a DC component removal circuit (not shown), if necessary, is used to produce wave forms as shown in FIG. 36E. The wave form of the signal shown in FIG. 36E has a frequency twice the frequency of the ringing answer signal. This is a feature of the FIG. 36E wave form. The signal shown in FIG. 36E is pulsed by the level detector 191 (FIG. 34) to have wave forms as shown in FIG. 36F. The signal pulsed is applied to a signal discriminator 192. In the discriminator, the pulsed signal is converted into the binary answer signal and then applied to the memory 20 (FIG. 3).

As described above, in this example, the detected receiving signal is multiplied by the receiving signal which is formed by delaying the former receiving signal integer times of the sweeping period. Through multiplication, only the true response signal periodically produced are extracted, and thus the irregularly produced noise is completely eliminated. If noise synchronizing with the sweeping period is accidentally included in the response signal, and this signal appears at the output of the multiplier, the signal discriminator connected at the post stage of the level detector 191 removes the noise to ensure the detection of only the normal response signal. In other words, provision of the delay circut 193 and the multiplier 194 in the extractor further enhances the noise removal ability of the present invention.

STILL ANOTHER MODIFICATION OF BINARY ANSWER SIGNAL EXTRACTOR

The binary answer extractor circuit may be constructed as a circuit 19c shown in FIG. 37. The output of the separation circuit 18 in FIG. 37 is applied to the level detector 191. The outputs of the level detector 191, a 1st delay circuit 195 and a second delay circuit 196 are applied to a majority decision circuit 197 which in turn produces a majority decision signal. The delay times of the 1st delay circuit 195 and the 2nd delay circuit 196 are selected to be the same as the sweeping period T (this is ordinarily several tens ms and changes in dependence of the width of the frequency range of the sweep frequency signal). The delay circuit with such a delay may readily be realized by using shift registers multi-stages or an RAM (random access memory). The majority decision circuit 197 may be constructed by using a full adder with three inputs A, B and $C_n$ and with outputs $\Sigma$ and $C_n+1$, as shown in FIG. 38A, for example. The truth table of the full adder is shown in FIG. 38B. The adder receives inputs A, B and $C_n$ and produces at the output the majority decision output $C_n+1$ (carry output). The term "majority decision output" means that at least two input signals are obtained during three sweep periods. Accordingly, the noise removal ability is additionally enhanced.

The principle of the noise removal will be described with reference to FIG. 39. FIG. 39A shows a sweep frequency signal (see 132 in FIG. 3) for sweeping from frequencies $F_1$ to $F_n$ with a sweeping period T. The sweep frequency signal is radiated as an interrogation signal toward the answer device 4. A transmitter receives the answer signal from the answer device, detects and separates it. The wave forms shown in FIG. 39B are those of the output signal of the separator 18. FIG. 39C shows wave forms of the output signal of the level detector 191 receiving the output of the separator 18. In FIG. 39C, ($S_{a1}$, $S_{b1}$), ($S_{a2}$, $S_{b2}$) and ($S_{a3}$, $S_{b3}$) designate pulsed answer signals outputted from different resonators, corresponding to the sweeping periods $T_1$, $T_2$ and $T_3$, respectively. Noises $N_1$ and $N_2$ included in the pulsed answer signal train appear in the periods $T_1$ and $T_2$, respectively. As shown, the noise $N_2$ and the pulsed answer signal $S_{b2}$ overlap each other. The pulsed answer signal train (FIG. 39C) is applied directly to the input A of the majority decision circuit 197. The pulse train shown in FIG. 39D delayed by one sweeping period by means of the delay circuit 195 and the pulse train shown in FIG. 39E further delayed by one sweeping period by means of the delay circuit 196, are applied to the inputs B and $C_n$ of the majority decision circuit, respectively. Notable here that the pulsed answer signals appear every sweeping period correctly at the corresponding positions on the time scale, while the noise is unstable in the appearing time and its wave shapes. In FIG. 39C, the pulsed answer signal $S_{a1}$ corresponds to $S_{a2}$ and $S_{a3}$, and the pulsed answer signal $S_{b1}$ to $S_{b2}$ and $S_{b3}$. Accordingly, when the signals shown in FIGS. 39C, 39D and 39E are majority-decided, the majority decision circuit 197 produces from the output terminal $C_{n+1}$ the pulse trains shown in FIG. 39F. The noises $N_1$ and $N_2$ included during the sweep period $T_1$ and $T_2$ can not be majority-decided on the same time scale so that these are not produced from the majority decision circuit 197.

The pulse train (FIG. 39F) thus outputted from the majority decision circuit 197 correspond to those that the ringing answer signal shown in FIG. 39B are pulsed. The wave shapes of the pulse train are very unique. The majority decision output is applied to the signal discriminator 192 (FIG. 37) finally to take pulse train as shown in FIG. 39G. In FIG. 39G, pulses indicated by broken line indicate that although the binary answer signals are essentially to appear at the positions of the broken pulses, the noise $N_2$ is included in the ringing answer signal and therefore such binary answer signals are dropped. Nevertheless, the correct binary answer signals may be obtained in the period $T_3$.

As described above, the binary answer signal extractor 19c shown in FIG. 37 is such that only the true resonance answer signal may be extracted by making a majority decision of three input signals of the majority decision circuit 197, with complete elimination of random noise. If the extractor is so designed as to make a product of the signals appearing in the periods $T_1$ and $T_2$, the wave form of the signal resulting from the product is as shown in FIG. 39H. The wave form of the signal outputted from the signal discriminator 197 when the product signal is applied to the discriminator 197 is shown in FIG. 39I. As seen from FIG. 39I, the broken binary signal b is surely dropped so that it is impossible to detect the correct answer signal. As described above, if such a noise as to synchronize with the sweeping period is included in the receiving signal and the noise passes through the majority decision circuit 197, the signal discriminator 192 removes the noises other than the correct ringing answer signal. Accordingly, this example may provide an object identification system with more improved signal to noise ratio.

MODIFICATION OF THE COMBINATION OF INTERROGATION CIRCUIT AND ANSWER DEVICE

The object identification system of the invention may be so designed as to produce UHF or SHF frequency band from the interrogation circuit. An example with such an function will be given with reference to FIG. 40. The reference pulse generated from the reference pulse generating circuit 131 in the interrogation circuit 13b is applied to the sweep frequency signal generator 132. The circuit 132 produces a sweep frequency signal of a medium frequency band. The frequency spectrum of the sweep frequency signal is designated by $f_s$. The circuit 13b is provided with first and second high frequency oscillators 135 and 136. These oscillators produce microwave frequency signals. The frequency spectra of these high frequency oscillators 135 and 136 are represented by $f_{c1}$ and $f_{c2}$, respectively, in FIG. 41. A transmitting/receiving antenna 15b includes first and second antennas 151 and 152. The output of the second high frequency oscillator 136 is applied to the second antenna 152. The output signals of the first frequency oscillator 135 and of the sweep frequency signal generator 132 are mixed in a mixer 137 and then fed to an adder 138. In the adder 138, the output of the first frequency oscillator 135 is added to the output of the mixer 137. The reason why the output frequency $f_{c1}$ of the first high frequency oscillator 135 is added, is that, since an insufficient magnitude of the $f_{c1}$ appears at the output of the mixer 137, this $f_{c1}$ is reinforced to have a sufficient amplitude as shown in FIG. 41 and then the output of the adder 138 is applied to the power amplifier 133. The first antenna radiates signals with spectra $f_{c1} \pm f_2$, and $f_{c1}$. The output frequency $f_{c2}$ of the second oscillator 136 to be fed to the second antenna 152 is approximate to $f_{c1}$ but slightly different from it. In this manner, radio waves are radiated from the transmitting/receiving antenna 156 toward the answer device 4b. In the answer device 4b, the transmitted radio waves are received by the answer antenna 5 and then the sweep frequency component $f_s$ is extracted from the mixer 41. The sweep frequency component $f_s$ is used to energize the resonators $7_1$ to $7_n$ and to bring out a difference frequency $\Delta f$ between $f_{c1}$ and $f_{c2}$ through the mixer 41. The feature of this example is provision of a resonance circuit 42 resonating with the difference frequency $\Delta f$. The resonating circuit 42 effectively extracts the frequency component of $\Delta f$. The mixer 41 mixes the $\Delta f$ signal with the $f_{c1}$ signal to produce $f_{c3}$ (= $f_{c1} - \Delta f$). The frequency $f_{c3}$ is amplitude-modulated by the answer signal (its frequency spectrum denoted as $f_r$) from the resonators $7_1$ to $7_n$. The spectra of the amplitude-modulated signal are illustrated in FIG. 41 and indicated by broken lines. The signals indicated by broken lines are radiated from the answer antenna 5 and is received by the first antenna 151. The signal from the antenna 151 is supplied to a receiving mixer 21 through the transmitting/receiving duplex circuit or transmitting/receiving branching circuit 14. In the mixer 21, the frequency $f_{c3}$ modulated by the $f_r$ is mixed with the $f_{c2}$ of the second high frequency oxcillator 136 and the output of the mixer 21 is coupled with the filter 161. The filter 161 permits the spectra from $2\Delta f - f_r$ to $2\Delta f + f_r$ pass therethrough. Therefore, the frequency component of $2\Delta f + f_r$ is taken out from the filter 21.

It is noted here that, if the receiving mixer mixes the output of the circuit 14 with the output frequency $f_{c2}$ from the circuit 136, since $f_{c3} \pm f_r$ and $f_{c2}$ are different, the called "NULL" point does not appear at the output of the mixer 21 even if the distance between the answer antenna 5 and the first antenna 151 changes. It is further noted that only when the answer antenna 5 is coupled with first and second antennas 151 and 152, the output signal appears at the output of the filter 21. These two are the essential feature of this modification. The output signal $2\Delta f \pm f_r$ of the filter 21 is amplified by an amplifier (not shown) up to a given level. The output of the amplifier is applied to a phase shifter 162, together with the output of the power amplifier 133. The output of the phase shifter 162 is applied to the detector 17 which in turn produces the ringing answer signal, as previously stated.

The modification has been described with an assumption that $f_{c3}$ is equal to $f_{c1} - \Delta f$. However, $f_{c3} = f_{c2} + \Delta f$ is allowable. In this case, the output frequency $f_{c1}$ of the first high frequency oscillator 135 in place of the $f_{c2}$ is used for the reference frequency to be applied to the receiving mixer 21.

In brief, in this modification, the interrogation circuit 13b is provided with the sweep frequency signal generator 132 for generating the frequency $f_s$, the first high frequency oscillator 135 for generating the frequency $f_{c1}$, and the second high frequency oscillator 136 for generating the frequency $f_{c2}$. These frequency signals are radiated toward the answer device 4b. The third signal frequency $f_{c3}$ is formed in the answer device 4b. The answer signals (frequency $f_r$) of a plurality of resonators carried by the carrier of the $f_{c3}$ are radiated from the answer antenna 5 to the transmitting/receiving antenna 15b. In the receiving side, the received signal is processed with reference to the output frequencies $f_{c1}$ and $f_{c2}$ of the first and second high frequency oscillator 135 or 136. In this way, the undesirable "NULL point" due to change of the propagation path is avoided.

OTHER MODIFICATION OF ANSWER DEVICE

The answer circuit 4 shown in FIG. 3 may be modified into an answer circuit 4c shown in FIG. 42. In the circuit 4c, the sweep frequency signal is received by the answer antenna 5 and the received signal passes through the hybrid circuit 43 to reach the filter 44 where only the sweep frequency signal included in the given frequency band is taken out. The sweep frequency signal taken out is then amplified by an amplifier 45 and then applied to a plurality of resonators $7_1$ to $7_n$, via a transformer 46. The resonance answer signals derived from the resonators energized are applied through the transformer 47 to the answer antenna 5 in accordance with the directionality of the hybrid circuit 43. In general, below 1 is set up the gain of circuit looping from the hybrid circuit 43, the filter 44, resonators $7_1$ to $7_n$, the transformer 47 to the hybrid circuit 43. In place of the hybrid circuit with a directionality, a second antenna (not shown) may be used and the output of the transformer 47 may be guided into the not shown antenna. In this case, these first and second antennas must be geometrically arranged so as to avoid a magnetic coupling of one with another. In the FIG. 42 construction, with omission of the hybrid circuit 43, the output of the transformer 47 is guided to a second antenna (not shown). And the above-mentioned loop including the second antenna is so set as to oscillate in a stationary condition. In other words, the circuit is so formed that, when the sweep frequency signal with a given amplitude is received by the second answer antenna, a capture effect takes place. Therefore, when receiving the sweep frequency signal through the first answer antenna 5, the answer device 4c intensively reproduces the sweep frequency signal and energizes the resonators $7_1$ to $7_n$ by the reproduced sweep frequency signal. Alternately, the resonance answer signal may be applied to the second answer antenna (not shown). The major effects of the answer device 4c are improvement of S/N and reduction of transmission power from the interrogation side.

While certain preferred embodiments of the invention have been described, it is to be distinctly understood that the invention is not limited thereto but may be otherwise variously embodied within the scope of the following claims.

What we claim is:

1. An object identification system comprising:
    an interrogation circuit including a sweep frequency signal generator for generating a sweep frequency signal;
    a transmitting/receiving duplex circuit connected to said interrogation circuit;
    transmitting/receiving antenna means which is connected to said transmitting/receiving duplex circuit and transmits said sweep frequency signal as an interrogation signal;
    an answer device which includes a plurality of resonators with different resonance frequencies connected in parallel one another and an answer antenna means connected in parallel with said resonators, and which is fixed on an object to be identified and transmits resonance answer signals corresponding to the resonances of said resonators in response to said interrogation signal toward said transmitting/receiving antenna means;
    phase adjusting means which is connected to said transmitting/receiving duplex circuit and said interrogation circuit and adjusts the phases of the sweep frequency signal from said sweep frequency signal generating circuit and said resonance answer signal to have a phase difference of substantially 0 or 180 degrees;
    a detector for detecting a ringing answer signal included in said resonance answer signal from the output of said phase adjusting means;
    a separation circuit for separating the ringing answer signals included in the output of said detector;
    a signal extracting circuit for extracting binary answer signals corresponding to said separated ringing answer signals; and
    a memory circuit for storing said binary answer signals.

2. An object identification system according to claim 1, in which said separator includes a filter permitting desired ringing components of said ringing answer signal from said detector to selectively pass therethrough; and a signal compressor which outputs a single impulse wave for a single ringing answer signal through the coincidence of the respective frequency components outputted from said filter on a time scale and transfers the single impulse wave to said binary answer signal extractor.

3. An object identification system according to claim 1, in which said binary answer signal extractor includes a level detector for forming a pulsed answer signal from the output of said separator and a signal discriminator for converting the pulsed answer signal into a binary answer signal, and said signal discriminator comprises: a clock pulse generator; an AND gate which receives at the inputs the output of said level detector and the clock pulse from said clock pulse generator and outputs clock pulse trains with a pattern corresponding to a pulse width-space pattern of the pulsed answer signal outputted from said level detector; a multi-stage shift register which receives at the respective stages clock pulses from said clock pulse generator as shift pulses and shifts the clock pulse trains with said pulse width-space pattern from said AND gate; a group of AND gates which are connected to selected stages of said shift register and each produce "1" when said clock pulse trains with said pattern are shifted up to a given stage; and AND gate for producing "1" when said AND gate group produces "1".

4. An object identification system according to claim 1, in which said binary answer signal extractor includes a level detector for forming a pulsed answer signal from the output of said separator, and a signal discriminator for converting said pulsed answer signal into a single binary answer signal; and said signal discriminator comprises a clock pulse generator, an AND gate which receives at the inputs the output of said level detector and the clock pulse from said clock pulse generator and outputs clock pulse trains with a pattern corresponding to a pulse width-space pattern of the pulsed answer signal outputted from said level detector; a multi-stage shift register which receives at the respective stages clock pulses from said clock pulse generator as shift pulses and shifts the clock pulse trains with said pulse width-space pattern from said AND gate; a memory for previously storing the information of a plurality of pulse width-space patterns within an allowable range corresponding to said pulse width-space pattern of said pulsed answer signal; and a coincidence circuit to which the outputs of said respective stages of said shift register as first input information and the information of said pulse width-space pattern stored in said memory as second input information are applied and which produces a binary answer signal when both said first and second information coincide each other.

5. An object identification system according to claim 1, in which said signal extractor comprises: a level detector for forming a pulsed answer signal from the output of said separator; a majority decision circuit for making a majority decision of a first input from said level detector, a second input which is the output of said level detector delayed by one sweep period of said answer circuit, and a third input which is the output of said level detector delayed by two sweep periods of said answer circuit; a signal discriminator which discriminates a majority decision signal outputted from said majority decision circuit to produce a binary answer signal corresponding to the truth resonance answer signal.

6. An object identification system according to claim 1, in which said binary answer signal extractor comprises: a multiplier for multiplying the first input from said separator by a second input which is the output of said separator delayed by integer times of the sweep period of said answer device; a level detector for converting the output of said multiplier into a pulse form; and a signal discriminator for outputting a binary answer signal corresponding to the truth resonance answer signal, through decision of the output of said level detector.

7. An object identification system according to claim 1, in which said answer device includes a plurality of resonators connected in parallel, an inductor connected in parallel with these resonators, and a capacitor connected in parallel with said inductor through said answer antenna; the capacitance of said capacitor is so selected that the resonance frequency of a series resonance circuit including said capacitor and said answer antenna coincides with the center frequency of the sweep frequency range used; and the inductance of said inductor is so selected that the resonance frequency of a parallel resonance circuit including the sum of parallel capacitances of said respective resonators and said answer antenna coincides with the center frequency of the sweep frequency range used.

8. An object identification system according to claim 1, in which said answer device comprising: a hybrid circuit; an answer antenna connected to said hybrid circuit; a filter for extracting only the sweep frequency signal from the output of said hybrid circuit; an amplifier for amplifying the output of said filter; a resonance circuit including a plurality of resonators connected in parallel; a coupling transformer for supplying the output of said amplifier to said resonance circuit; and a coupling transformer for feeding back a resonance answer signal produced in said resonance circuit.

9. An object identification system according to claim 1, in which the sweep frequency signal generating circuit included in said interrogation circuit includes a voltage control oscillator, said interrogation circuit includes means to control said voltage control oscillator circuit in order that a sweep stop period with a constant output frequency is formed between adjacent sweep periods.

10. An object identification system according to claim 1, in which said interrogation signal circuit comprises: a first high frequency oscillator for producing a high frequency signal with a first frequency $f_{c1}$; a second high frequency oscillator for producing a high frequency signal with a second high frequency $f_{c2}$; a pulse generator for generating a reference frequency signal with a reference frequency $f_s$; and means for forming a frequency $f_{c1} \pm f_s$ from said first frequency $f_{c1}$ and said reference frequency $f_s$; said transmitting-/receiving antenna means includes a first antenna for radiating a signal including said frequency ($f_{c1} \pm f_s$) and said first frequency $f_{c1}$ and a second antenna for radiating a signal with said $f_{c2}$ frequency; said answer device includes means for radiating a high frequency resonance answer signal including said resonance frequency $f_r$ carried on a carrier signal with a third frequency $f_{c3}$ formed by said received first and second frequency $f_{c1}$ and $f_{c2}$, ($f_{c1} \pm f_s$) and said resonance frequency $f_r$ of said resonator; and said object identification system further comprises means for processing a high frequency resonance answer signal received by said first antenna by said output frequency $f_{c2}$ of said second high frequency oscillator, between said transmitting/receiving duplex circuit and said phase adjusting means.

* * * * *